United States Patent
Vahalia et al.

(10) Patent No.: US 6,275,953 B1
(45) Date of Patent: *Aug. 14, 2001

(54) RECOVERY FROM FAILURE OF A DATA PROCESSOR IN A NETWORK SERVER

(75) Inventors: Uresh K. Vahalia, Waban; Uday Gupta, Westford; Dennis P. J. Ting, Groton, all of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,859

(22) Filed: Sep. 26, 1997

(51) Int. Cl.$^7$ ........................................ G06F 11/16
(52) U.S. Cl. ........................................ 714/11; 714/4
(58) Field of Search ........................ 714/11, 4, 10, 714/13

(56) References Cited

U.S. PATENT DOCUMENTS

| | | | |
|---|---|---|---|
| 4,133,027 | * 1/1979 | Hogan | 714/3 |
| 4,141,066 | * 2/1979 | Keiles | 714/1 |
| 5,491,788 | * 2/1996 | Cepulis et al. | 714/13 |
| 5,513,314 | * 4/1996 | Kandasamy et al. | 714/6 |
| 5,555,404 | * 9/1996 | Torbjornsen et al. | 714/10 |
| 5,592,611 | * 1/1997 | Midgely et al. | 714/4 |
| 5,608,865 | * 3/1997 | Midgely et al. | 714/16 |
| 5,652,833 | * 7/1997 | Takizawa et al. | 714/10 |
| 5,737,747 | * 4/1998 | Vishlitzky et al. | 711/118 |
| 5,774,640 | * 6/1998 | Kurio | 714/4 |
| 5,812,748 | * 9/1998 | Ohran et al. | 713/11 |
| 5,815,651 | * 9/1998 | Litt | 714/20 |
| 5,829,046 | * 10/1998 | Tzelnic et al. | 711/162 |
| 5,845,061 | * 12/1998 | Miyamoto et al. | 714/4 |
| 5,864,653 | * 1/1999 | Tavallaei et al. | 714/2 |
| 5,864,654 | * 1/1999 | Marchant | 714/3 |
| 5,892,915 | * 4/1999 | Duso et al. | 709/219 |
| 5,893,140 | * 4/1999 | Vahalia et al. | 711/118 |
| 5,917,997 | * 6/1999 | Bell et al. | 714/4 |
| 5,923,854 | * 7/1999 | Bell et al. | 709/243 |
| 5,935,215 | * 8/1999 | Bell et al. | 714/43 |
| 5,936,936 | * 8/1999 | Alexander, Jr. et al. | 370/216 |
| 5,951,650 | * 9/1999 | Bell et al. | 709/238 |
| 6,108,300 | * 8/2000 | Coile et al. | 714/4 |
| 6,144,969 | * 11/2000 | Inokuchi et al. | 707/200 |

* cited by examiner

Primary Examiner—Thomas Lee
Assistant Examiner—Thuan Du
(74) Attorney, Agent, or Firm—John M. Gunther, Esq.; William R. Clark, Esq.; Christopher K. Gagne, Esq.

(57) ABSTRACT

A network file server includes a first set of data processors for receiving requests from clients, and a second set of data processors for accessing read-write file systems. A respective data processor in the second set is assigned to each file system for exclusive management of locks on the file system. The file server can detect failure of a failed data processor and automatically recover from the failure. When a failure of a data processor in the first set is detected, a spare data processor is programmed with the logical and physical network addresses of the failed data processor so that the spare data processor assumes the network identity of the failed data processor. When a failure of a data processor in the second set is detected, responsibility for management of the locks on each file system managed by the failed data processor is transferred to an operational data processor. Preferably the responsibility is transferred to the operational data processors in such a way as to balance loading on the operational data processors. The data processors can be commodity digital computers for low cost, and a cached disk storage subsystem or file system caches and remote dual copy techniques can be used to ensure high performance and high data availability.

14 Claims, 27 Drawing Sheets

FIG. 10 — 105

| READ-ONLY CACHE OF CLIENT INFO. | | | | | |
|---|---|---|---|---|---|
| CLIENT ID | CLIENT PASSWORD | PRIORITY | SECURITY LEVEL | ACCESS GROUP | NETWORK IP ADDRESS |
| — | — | — | — | — | — |
| — | — | — | — | — | — |
| — | — | — | — | — | — |

FIG. 11 — 107

| READ-ONLY CACHE OF FILE AUTHORIZATION AND OWNERSHIP | | | | | | | | |
|---|---|---|---|---|---|---|---|---|
| FILE ID | FILE PASSWORD | SECURITY LEVEL | ACCESS TYPE | ACCESS GROUP | CLIENT OWNER | DATA MOVER OWNER | SF | REMOTE FILE SYSTEM |
| — | — | — | — | — | — | — | — | — |
| — | — | — | — | — | — | — | — | — |
| — | — | — | — | — | — | — | — | — |

FIG. 12 — 111

| CACHE OF FILE ACCESS INFO. | | | | | |
|---|---|---|---|---|---|
| FILE ID | LOCKING INFO. | | | | WRITE PENDING FLAG |
| | R | W | LOCK OWNERS | WAIT LIST | |
| — | — | — | — | — | — |
| — | — | — | — | — | — |
| — | — | — | — | — | — |

FIG. 13 — 113

| CACHE OF FILE DATA AND ATTRIBUTES | | | | |
|---|---|---|---|---|
| FILE ID | DATA | ATTRIBUTES | WRITE PENDING FLAGS | ABORT FLAG |
| — | — | — | — | — |
| — | — | — | — | — |
| — | — | — | — | — |

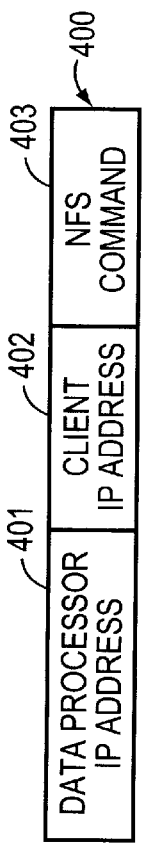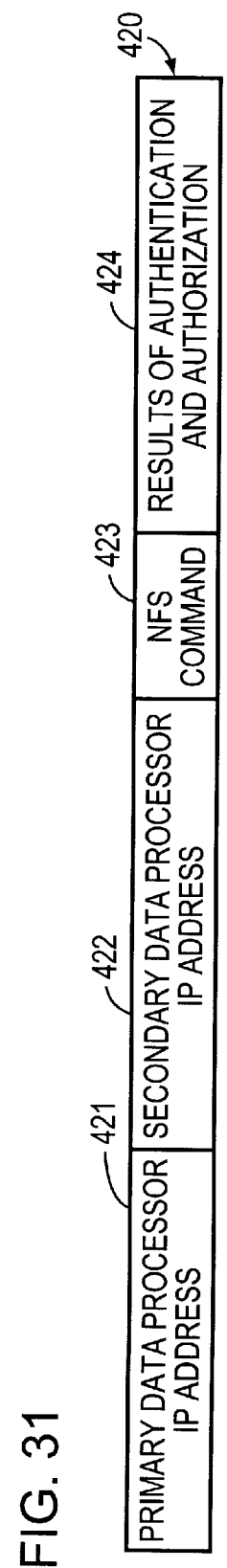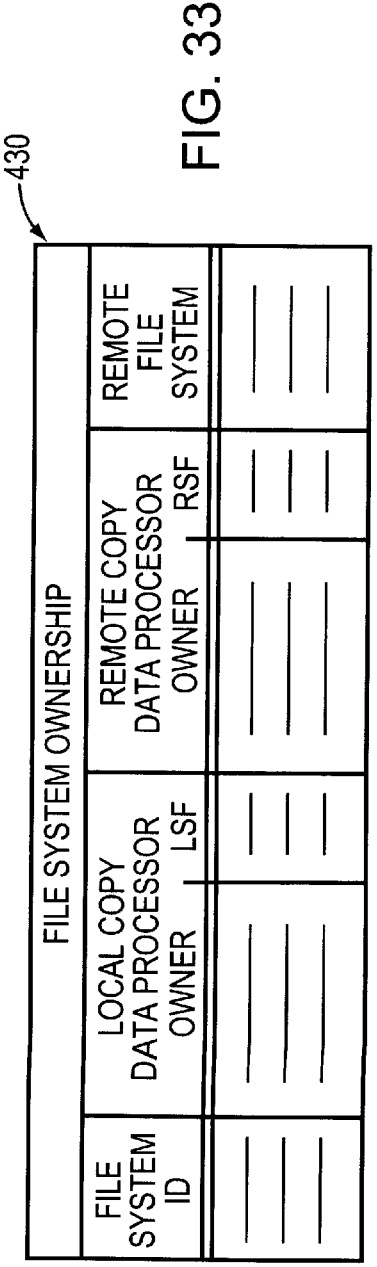
FIG. 30
FIG. 31
FIG. 32
FIG. 33

RECOVERY FROM FAILURE OF A DATA PROCESSOR IN A NETWORK SERVER

BACKGROUND OF THE INVENTION

1. Field of the Invention

The present invention relates generally to data processing systems, and more particularly to network servers.

2. Background Art

Mainframe data processing, and more recently distributed computing, have required increasingly large amounts of data storage. This data storage is most economically provided by an array of low-cost disk drives integrated with a large semiconductor cache memory. Such cached disk arrays were originally introduced for use with IBM compatible host computers. A channel director in the cached disk array executed channel commands received over a channel from the host computer. More recently, a network attachment has been proposed for interfacing the cached disk array to a network. The network attachment, for example, is a computer programmed to communicate with clients on a network by following a network communication protocol, and to communicate with the cached disk array by issuing channel commands. Although this approach has the advantage of using a conventional cached disk array, the capabilities of the cached disk array are under utilized in this configuration, because the network attachment is a bottleneck to data access.

Cached disk arrays typically have multiple internal data processors, dual redundant internal data paths, and multiple input channels in order to provide a high degree of data availability in the event of various kinds of failures. If a data access request directed to one input channel is not acknowledged due to a failure of an internal data processor or input channel, then the data access request can be retransmitted to the cached disk array on another input channel with a high probability that the request will be acknowledged. A network attachment in the form of a single conventional digital computer would not provide such a high degree of data availability because a failure of the central processing unit, program memory, or power supply of the single conventional digital computer would block access by all network clients to the cached disk array.

Conventional digital computers known as personal computers or commodity digital computers, however, are very much less expensive than cached disk arrays or digital computers designed for high data availability. Therefore, it would be very desirable to construct a network attachment or a network file server using only commodity digital computers in some way that would provide the same high degree of data availability provided by a typical cached disk array. Moreover, it would be desirable to recover from a data processor failure in such a way that a network client would not have to retransmit a data access request to a different network address.

SUMMARY OF THE INVENTION

In accordance with one aspect of the invention, there is provided a method of operating data processors for servicing clients in a network. Each of the data processors has a respective network interface for interfacing to the network. Each network interface has a respective network address. Each network interface is programmable for setting its network address. An operational data processor responds to a failure of a failed data processor by setting the network address of the network interface of the operational data processor to the network address of the network interface of the failed data processor. Then the operational data processor services client requests received by the network interface of the operational data processor.

In accordance with another aspect of the invention, there is provided a method of operating data processors including a first set of data processors and a second set of data processors for providing clients with read-write access to read-write file systems. Each of the data processors in the first set of data processors receives requests from the clients. Each of the data processors in the second set of data processors is assigned to manage locks on at least one of the read-write file systems. Locks on each of the read-write file systems is managed by an assigned one of the data processors in the second set of data processors. Each data processor in the first set of data processors responds to a client request for access to a respective one of the read-write file systems by accessing stored assignment information indicating the assigned one of the data processors in the second set of data processors presently assigned to manage locks on the respective one of the read-write file systems. Processing for the client request is continued by the assigned one of the data processors in the second set of data processors indicated by the stored assignment information as being presently assigned to manage locks on the respective one of the read-write file systems. Each data processor in the second set of data processors continues processing for a client request for read-write access to a read-write file system to which the data processor in the second set of data processors is presently assigned to manage locks on by performing an access operation including management of locks on the read-write file system to which the data processor in the second set of data processors is presently assigned to manage locks on. A data processor performs failure recovery of a failed data processor in the second set of processors by detecting failure of the failed data processor, and upon detecting the failure of the failed data processor in the second set of data processors, re-assigning to an operational data processor each of the read-write file systems to which the failed data processor had been assigned to manage locks on at the time of detecting the failure of the failed data processor.

In a preferred embodiment, a file server for servicing clients in a data network includes a cached disk storage subsystem, and a plurality of data mover computers linking the cached disk storage subsystem to the data network for transfer of data between the cached disk storage subsystem and the network. Each data mover computer is programmed to maintain a local cache of file access information including locking information for a respective group of files that the data mover computer has been assigned to directly access, and an index that indicates the group of files that the data mover computer has been assigned to directly access. Each data mover computer is programmed to respond to a request from a client for access to a file by checking the index to determine whether or not the data mover computer has been assigned to directly access the file. When the checking determines that the data mover computer has been assigned to directly access the file, the data mover computer accesses the file. When the checking determines that the data mover computer has not been assigned to directly access the file, the data mover computer forwards the request to another data mover computer that maintains a local cache of file access information for the file. A data processor in the file server is programmed to perform failure recovery of a failed data mover computer by detecting failure of the failed data mover computer, and upon detecting failure of the failed data mover computer, re-assigning to an operational data mover computer each group of files to which the failed data mover computer had been assigned to directly access at the time of detecting the failure of the failed data mover computer.

BRIEF DESCRIPTION OF THE DRAWINGS

Other objects and advantages of the invention will become apparent upon reading the following detailed description with reference to the accompanying drawings wherein:

FIG. 10 is a diagram showing information in a read-only cache of client information in the data movers of FIG. 9;

FIG. 11 is a diagram showing information in a read-only cache of file authorization and ownership information in the data movers of FIG. 9;

FIG. 12 is a diagram showing information in a cache of file access information in the data movers of FIG. 9;

FIG. 13 is a diagram showing information in a cache of file data and attributes in the data movers of FIG. 9;

FIG. 30 is a diagram showing a format for a client request that is transmitted over the data network from a client to a server;

FIG. 31 is a diagram showing a format for a client request as transmitted over an internal Ethernet link in the network file server of FIG. 9 from a data mover having received a client file access request to the data mover that is the owner of the file for which access is requested;

FIG. 32 is a diagram showing a format of a message transmitted over the network in FIG. 29 from a data processor having received a file access request from a client to a data processor that is the owner of the local copy of the file for which access has been requested; and FIG. 33 is a table of file system ownership found in each of a number of digital computers in the distributed file server of FIG. 29.

Figure 1:
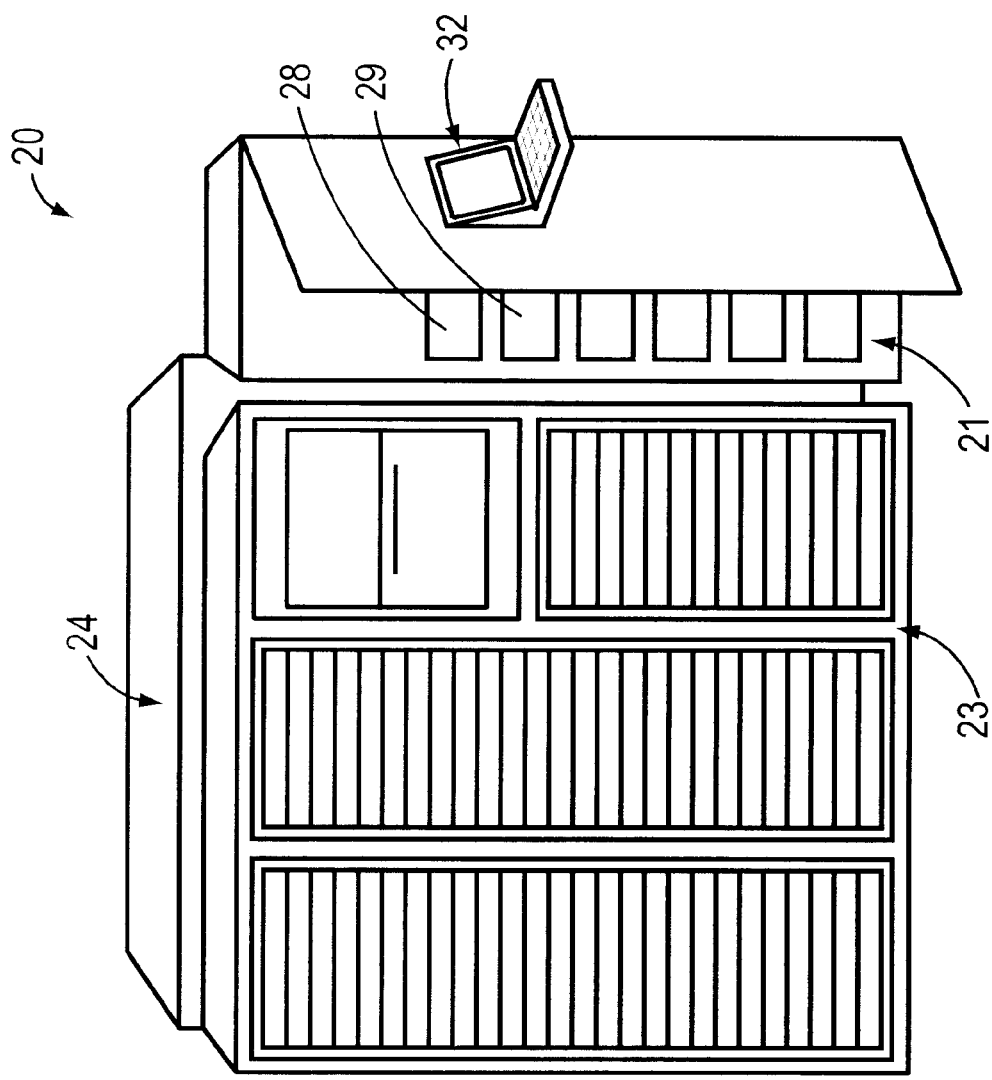
FIG. 1 is a perspective view of a network file server that incorporates the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

I. The Architecture of a Network File Server

Turning now to FIG. 1 of the drawings, there is shown a network file server generally designated 20 incorporating the present invention. The network file server 20 includes an array of data movers 21, a network server display and keyboard 32, a cached disk storage subsystem 23, and an optional tape silo 24. At least two of the data movers 28, 29 are also programmed to service the network server display and keyboard 32, and these particular data movers will be referred to as display and keyboard servers. However, at any given time, only one of the display and keyboard servers 28, 29 is active in servicing the network server display and keyboard 32.

The network file server 20 is managed as a dedicated network appliance, integrated with popular network operating systems in a way, which, other than its superior performance, is transparent to the end user. It can also be provided with specialized support for network backup services and for isochronous data streams used in live, as well as store-and-forward, audio-visual applications, as described in Published International Application WO 97/16023 published May 1, 1997 entitled "Staggered Stream Support for Video On Demand" by Uresh K. Vahalia et al., incorporated herein by reference.

The network file server 20 is directed to high-end file server applications such as the Network File System (NFS, version 2 and 3) (and/or other access protocols). NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

The clustering of the data movers 21 as a front end to the cached disk storage subsystem 23 provides parallelism and scalability. The clustering of random-access memory in the data movers 21 also supplements the cache resources of the cached disk storage subsystem 23, as will be further described below.

Each of the data movers 21, including the display and keyboard servers 28, 29, is a high-end commodity computer, providing the highest performance appropriate for a data mover at the lowest cost. The data movers 21 are mounted in a standard 19" wide rack. Each of the data movers 21, for example, includes an Intel processor connected to an EISA or PCI bus and at least 64 MB of random-access memory. The number of the data movers 21, their processor class (i486, Pentium, etc.) and the amount of random-access memory in each of the data movers, are selected for desired performance and capacity characteristics, such as the number of concurrent network clients to be serviced. Preferably, one or more of the data movers 21 are kept in a standby mode, to be used as "hot spares" or replacements for any one of the other data movers that fails to acknowledge commands from the other data movers or is otherwise found to experience a failure.

Each of the data movers 21 contains one or more high-performance FWD (fast, wide, differential) SCSI connections to the cached disk storage subsystem 23. Each of the data movers 21 may also contain one or more SCSI connections to the optional tape silo 24. Each of the data movers 21 also contains one or more bidirectional network attachments 30 configured on the data mover's EISA or PCI bus. The network attachments 30, for example, are Ethernet, FDDI, ATM, DS1, DS3, or channelized T3 attachments to data links to a network (25 in FIG. 2). The network 25 connects these network attachments to the network clients 54, for example, through an ATM switch 53. Each of the data movers 21 also includes an additional Ethernet connection to an internal dual-redundant Ethernet link (26 in FIG. 2) for coordination of the data movers with each other, including the display and keyboard servers 28, 29.

The display and keyboard server 28, 29 active for servicing of the display and keyboard 32 can also conduct one or more standard management and control protocols such as SNMP (RFC 1157, M. Schoffstall, M. Fedor, J. Davin, J. Case, "A Simple Network Management Protocol (SNMP)," May 10, 1990). SNMP is an internet protocol that permits inspection and modification of system variables such as the network address (IP) and the number of buffers for network communication. In addition to the connections described above that the data movers 21 have to the network 25, the cached disk storage subsystem 23, and the optional tape silo 24, each of the display and keyboard servers 28, 29 also has a connection to a serial link 31 to the network server display and keyboard 32. The display and keyboard servers 28, 29 run a conventional operating system (such as Windows NT or UNIX) to provide a hot-failover redundant configuration for servicing of the display and keyboard 32. An operator at the display and keyboard 32 uses SNMP for management and control of the resources of the network file server 20.

The display and keyboard server that is not active in servicing the display and keyboard 32 periodically monitors the display and keyboard server that is active, for example by polling over the dual-redundant internal Ethernet 26 or by receiving a status signal that is periodically transmitted by the active one of the display and keyboard servers. When the monitoring by the display and keyboard server that is not active in servicing the display and keyboard 32 indicates a failure of the active display and keyboard server, then the display and keyboard server that is not active in servicing the display and keyboard sends a command over the dual-redundant Ethernet to the active display and keyboard server to shut down the active display and keyboard server, and then the display and keyboard server that is not active in servicing the display and keyboard assumes active status and begins servicing the display and keyboard.

The cached disk storage subsystem 23 is configured for an open systems network environment. Preferably the cached disk storage subsystem 23 is a Symmetrix 5500 (Trademark) ICDA (Trademark) manufactured by EMC Corporation, 171 South Street, Hopkinton, Mass., 01748-9103.

Figure 2:
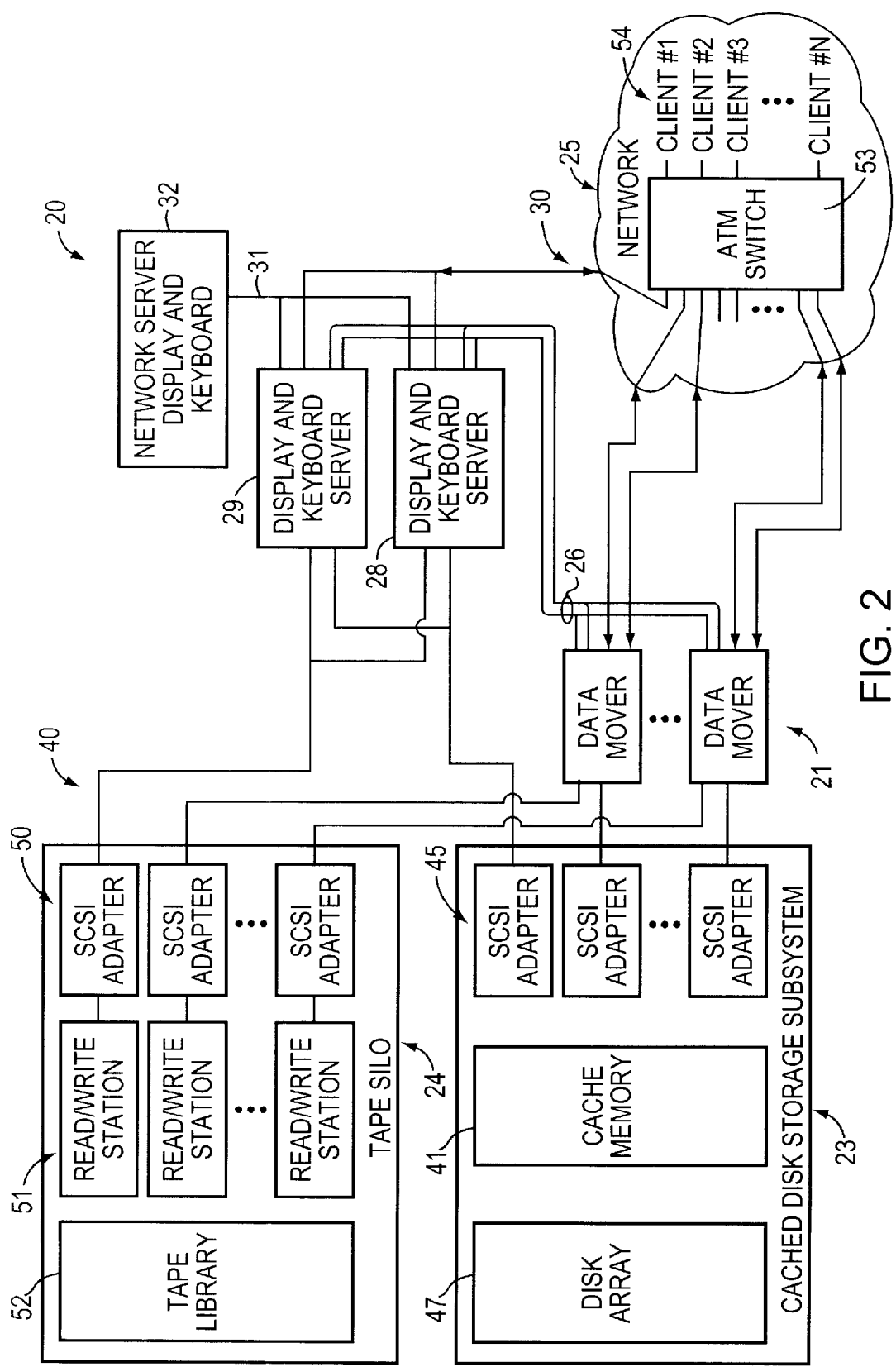
FIG. 2 is a block diagram of the network file server of FIG. 1 and its connections to a network.

Turning now to FIG. 2, there is shown a block diagram of the network file server 20 including the SCSI connections 40 among the cached disk storage subsystem 23, the optional tape silo 24, the display and keyboard servers 28, 29, and the data movers 21. The cached disk storage subsystem 23 includes a large capacity semiconductor cache memory 41 and SCSI adapters 45 providing one or more FWD SCSI links to each of the data movers 21, including the display and keyboard servers 28, 29.

The optional tape silo 24 includes an array of SCSI adapters 50 and an array of read/write stations 51. Each of the read/write stations 51 is connected via a respective one of the SCSI adapters 50 and a FWD SCSI link to a respective one of the data movers 21, including the display and keyboard servers 28, 29. The read/write stations 51 are controlled robotically in response to commands from the data movers 21 for tape transport functions, and preferably also for mounting and unmounting of tape cartridges into the read/write stations from storage bins.

In a preferred mode of operation, to archive data from a file from the network to tape, one of the data movers 21 receives the file from the network 25 and prestages the file to the cached disk storage subsystem 23 at a high rate limited by the network transmission rate (about 150 GB/hour). Then one of the data movers 21 destages the file from the cached disk storage subsystem 23 to an associated one of the read/write stations 51 at a tape device speed (about 7 GB/hour). For most applications, prestaging to disk can be done immediately, and staging from disk to tape including sorting of files onto respective tape cassettes can be done as a background operation or at night, when the load on the network file server 20 is at a minimum. In this fashion, the cached disk storage subsystem 23 can absorb a high data inflow aggregation from tens or hundreds of network links streaming from multiple sites, and balance this load on the read/write stations 41. Prestaging to the cached disk storage subsystem allows better use of the read/write stations 51, matching of server flow to tape streaming flow, and reduction of tape and read/write station wear. Prestaging to the back-end also allows multiple classes of backup and restore services, including instant backup for files maintained on disk in the cached disk storage subsystem 23, and temporary batch backup pending a success or failure acknowledgment. Prestaging to the cached disk storage subsystem 23 also makes economical an on-line archive service performing the staging from the cached disk storage subsystem 23 to tape as a background process.

Figure 3:
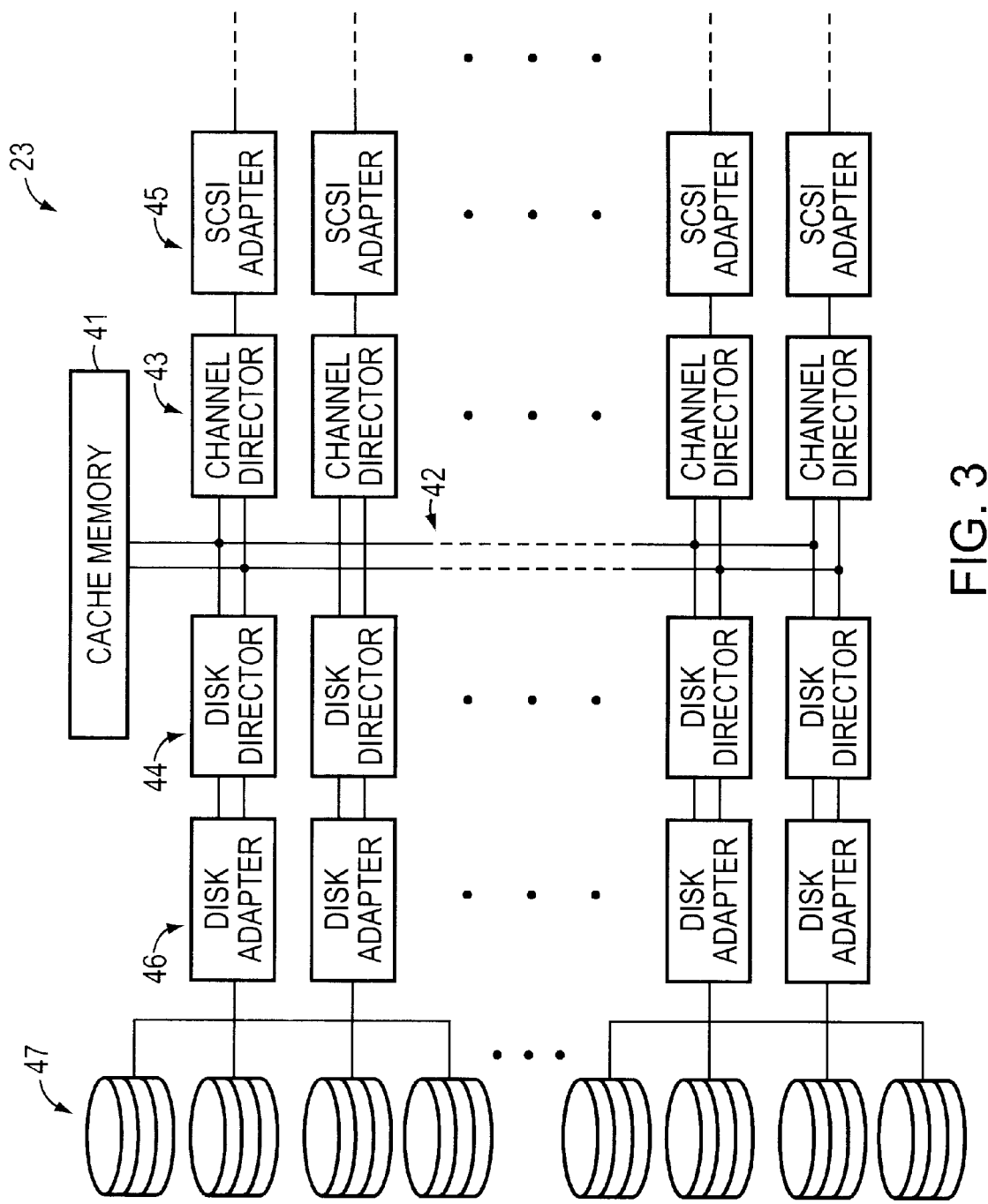
FIG. 3 is a block diagram of a cached disk storage subsystem used in the network file server of FIG. 1.

Turning now to FIG. 3, there is shown a more detailed block diagram of the cached disk storage subsystem 23. The cache memory 41 is composed of dynamic RAM cards mating with a dual redundant back-plane system bus 42. The cached disk storage subsystem 23 also includes microprocessor cards that mate with the back-plane system bus 42 and are programmed to function as channel directors 43 or disk directors 44. Each of the channel directors 43 is interfaced through one of a number of SCSI adapters 45 to the SCSI interface of one of the data movers 21. Each of the disk directors 44 is interfaced through at least one of a number of disk adapters 46 connected to a string of commodity FBA (fixed-block architecture) disk drives 47. Each channel director 43 accesses data in the cache memory 41 in response to a request from its associated data mover. If data to be read by a channel director is not found in cache memory, one of the disk directors 44 and disk adapters 46 transfers or "stages" the data from the disk array 47 to the cache memory 41. In a background process, the disk directors 44 and disk adapters 46 also write-back data from the cache memory 41 to the disk array 47, after the channel directors write data to the cache memory 41. In addition to providing intermediate storage for the data transferred between the channel directors 43 and the disk directors 44, the cache memory 41 also provides intermediate storage for control information transferred among the channel directors and disk directors.

The bus 42 is preferably the back-plane of a printed-circuit card-cage or main-frame in the cached disk storage subsystem 23, and each of the channel directors 43 and disk directors 44 is constructed on a printed circuit board that is mounted in the card-cage or main-frame. The channel director and disk director boards are further described in Yanai et al. U.S. Pat. No. 5,335,352, issued Aug. 2, 1994, and entitled Reconfigurable, Multi-Function Disc Controller, incorporated herein by reference. The cache memory 41 is constructed on a number of additional printed circuit boards that are mounted in the card-cage or main-frame. Further details regarding the construction and operation of the cached disk storage subsystem 23 are disclosed in Yanai et al., U.S. Pat. No. 5,206,939, issued Apr. 27, 1993; and Yanai et al. U.S. Pat. No. 5,381,539, issued Jan. 10, 1995; all incorporated herein by reference.

II. Network File Server Software

Figure 4:
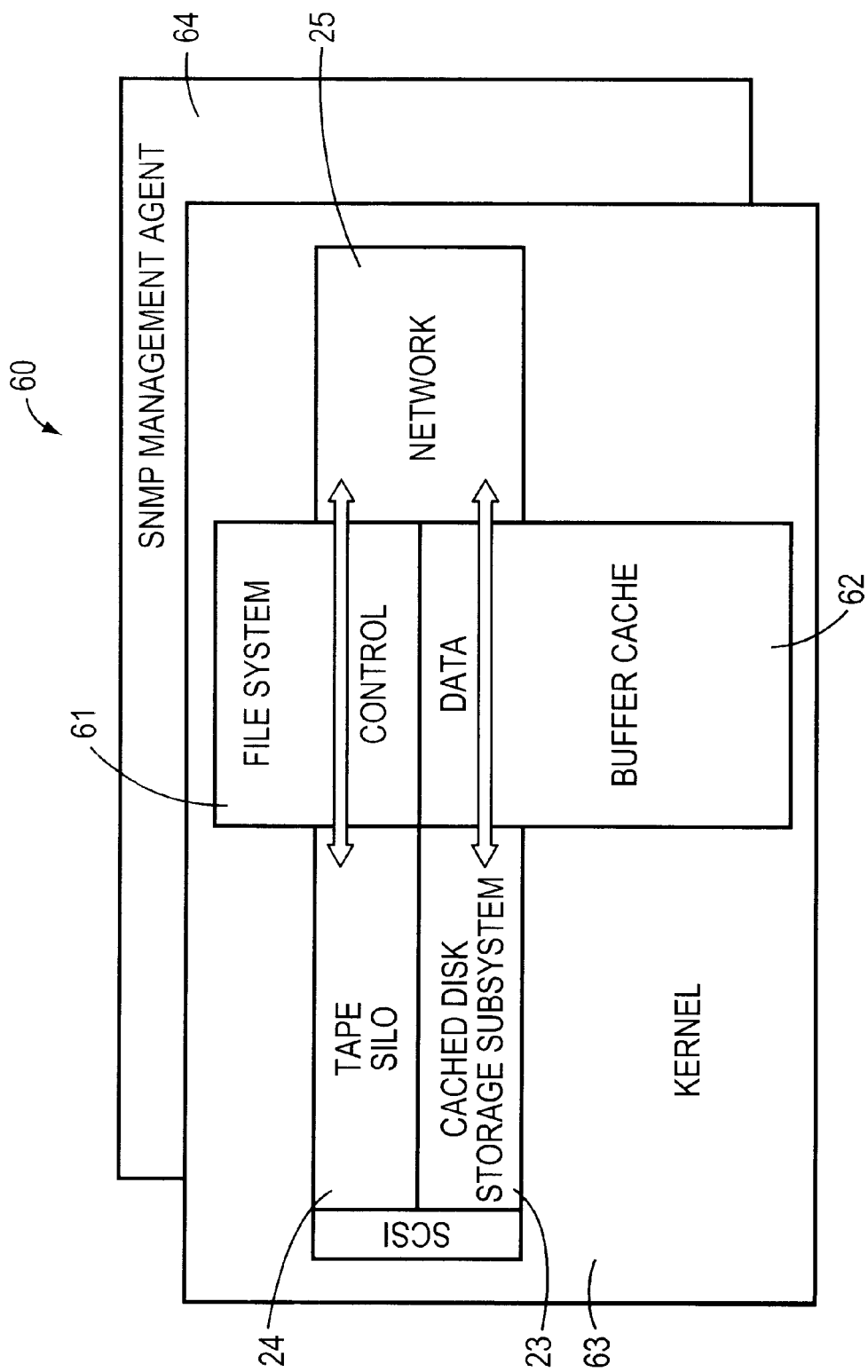
FIG. 4 is a block diagram showing software structure in the network file server of FIG. 1.

Turning now to FIG. 4, there is shown a block diagram of software 60 providing a real-time processing environment in the network file server (20 of FIGS. 1 and 2). The software 60 is executed by the processors of the data movers 21, including the display and keyboard servers 28, 29. The software 60 also provides an environment for managing file services and multiple high-performance data streams as well as a standard set of service-level application program interfaces (APIs) for developing and porting file service protocols (such as NFS). The software 60 is an application run by a general purpose operating system such as Microsoft NT.

The software 60 includes a file system 61 for controlling transfer of data between the network 25 and the cached disk storage subsystem (23 in FIGS. 1 and 2) or the optional tape silo (24 in FIGS. 1 and 2). A buffer cache 62 composed of part of the random-access memory of the data movers 21 is used as a buffer for this data transfer.

The software 60 also includes a kernel program 63 providing a real-time scheduler. The kernel program 63 separates control information (file access and synchronization protocols) from the underlying data stream.

The software 60 further includes an SNMP management agent 64 supporting a Simple Network Management Protocol. SNMP is a standard internet protocol for inspecting and changing system variables. For example, the SNMP management agent is used when an operator at the network server display and keyboard (32 in FIG. 1) sets the network IP address of the network file server (20 in FIG. 1).

Figure 5:
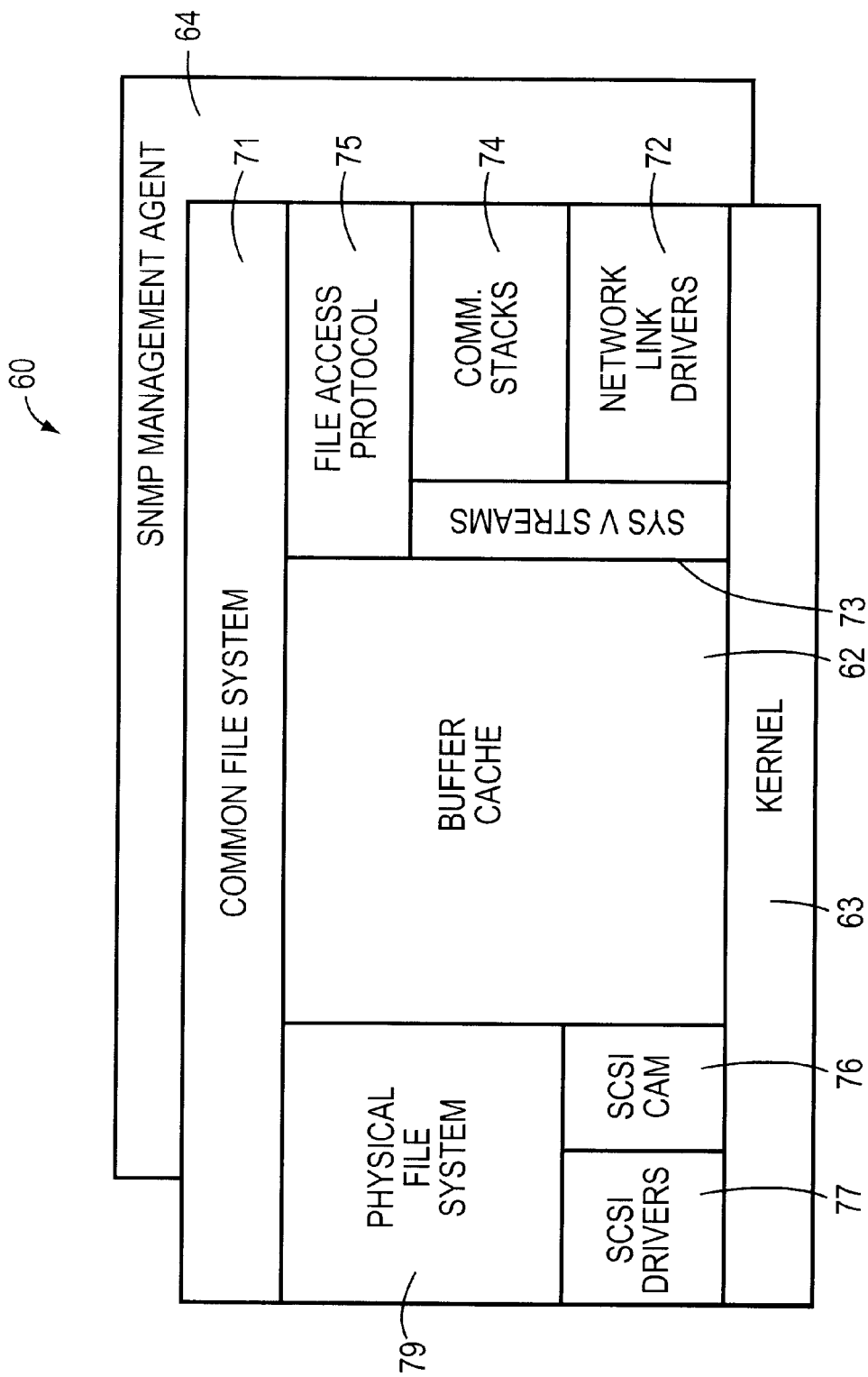
FIG. 5 is a more detailed block diagram showing various modules of the software structure of FIG. 4.

Turning now to FIG. 5, there is shown a more detailed block diagram of the software structure 60 in each data mover. The file system 61 in FIG. 4 has been expanded into its components. These components are a common file system 71, a group of software modules providing communication between the common file system and the network, and a group of software modules providing communication between the common file system and the cached disk storage subsystem 23 or the optional tape silo 24. The common file system 71 uses the Virtual File System (VFS), which is an industry-standard back-end file system switch, to interface with the physical file systems 79. VFS translates NFS Common File System requests. (The NFS Common File System Requests in themselves are translations of NFS requests to the intended physical file storage devices. NFS is one of the file access protocols 75.) The common file system 71 accesses the buffer cache 62 during data transfers between the network (25) and disk or tape storage (23, 24).

The group of software modules providing communication between the common file system and the network includes file access protocols 75 and a network server interface 73 using communication stacks 74 and network link drivers 72. The file access protocols 75 include a set of industry standard network server protocols such as NFS. Other file access protocols compatible with the network 25 could also be used, such as Novell NCP, LanManager, SMB, etc.

The file access protocols 75 are layered between the communication stacks 74 and the common file system 71. The communication stacks 74 provide the network access and connectivity for the data transmitted to the file access protocol layer 75 from the network link drivers 72. The communication stacks include TCP/IP, IPX/SPX, NETbeui, or others. The network server interface 73 allows porting of the network software and file access protocols 72, 74, 75. This interface 73 is System V Streams. There could be multiple concurrent instances of the file access protocols 75, communication stacks 74, and drivers 72.

The group of software modules providing communication between the common file system and the integrated cached disk array 23 or tape silo 24 includes physical file systems 79 and SCSI CAM 76 which provides a standard framework (SCSI Common Access Method) to the SCSI bus drivers 77. The physical file systems 79 include at least one conventional industry standard-based file system such as the UNIX ufs file system. Other industry standards-based file systems could also be used, such as VxFS, ISO9660, etc. The buffer cache 62 buffers data passed between the SCSI drivers 77 and the physical file system 79. There could be multiple concurrent instances of the network drivers 72, communication stacks 74, file access protocols 75, SCSI drivers 77, and physical file systems 79.

Figure 6:
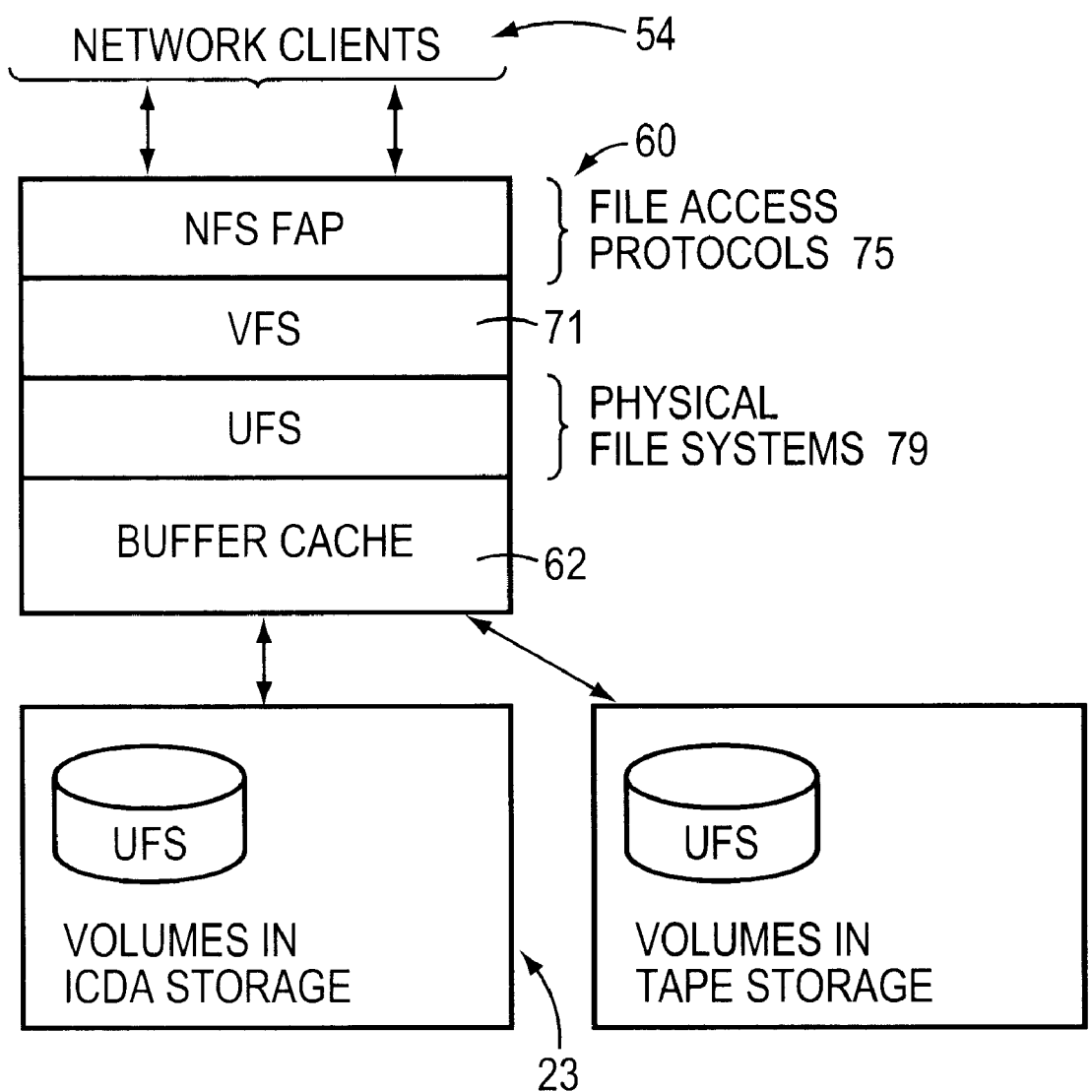
FIG. 6 is a specific example of software modules of FIG. 4.

FIG. 6 is a specific example of software modules of FIG. 5. A conventional UNIX File System (UFS) is a physical file system exported onto the network using NFS. The file system switch that directs client NFS requests to the intended physical file system is implemented using a standard virtual file-system (Vnode/VFS) interface.

The file server software runs as an embedded system that includes a real-time kernel (63 in FIGS. 4 and 5). The main components of the kernel are a task scheduler, frameworks for writing device drivers, and a number of system services that are commonly found in similar real-time kernels. The system services include kernel interfaces to memory management, timers, synchronization, and task creation. All kernel tasks run in a single unprotected address space. As a result of this, no copy operations are required to move data from the cached disk storage subsystem 23 to the network. Copying is eliminated by passing references to common buffers across all subsystems.

The kernel 63 may use the scheduler described in K. K. Ramakrishnan et al., "Operating System Support for a Video-On-Demand File Service," *Multimedia Systems,* Vol. 3, Springer-Verlag, 1995, pp. 53–65, incorporated herein by reference, and Vaitzblit et al., U.S. Pat. No. 5,528,513, incorporated herein by reference. This scheduler supports three classes of schedulable tasks; namely, general-purpose tasks, real-time tasks, and isochronous tasks. Isochronous tasks can be used for providing continuous media file access services, which are not necessary for practicing the present invention. Real-time and general-purpose tasks are scheduled using a weighted round-robin scheme.

The general-purpose class supports pre-emptible tasks that are suitable for low-priority background processing. In order to ensure that general-purpose tasks can always make progress, this class is granted a minimum CPU processing quantum.

The general-purpose class is implemented as a standard threads package, with a thread corresponding to a general-purpose task as described herein. A suitable threads package is described in A. D. Birrell, "An Introduction to Programming with Threads," Systems Research Center Technical Report, No. 35, Digital Equipment Corporation, Maynard, Mass., (1989).

The real-time class is suitable for tasks that require guaranteed throughput and bounded delay. Real-time tasks are not pre-emptible; however, a software provision is made to allow for the existence of safe "preemption windows" in which all isochronous tasks can be executed. A weight and a scheduling flag is assigned to every real-time task. The weight is used as the means to limit the amount of processing time taken by the real-time task at each invocation. The scheduling flag is used to indicate that the task has pending work and to signal the scheduler that the task needs to be invoked. The scheduling flag may be set by an interrupt service routine or a task of any class.

In the network file server, real-time tasks are used to implement "polling" device drivers and communication stacks The method of polling for pending work, as opposed to interrupt-driven processing, contributes to system stability and alleviates most of the problems that arise during overloads. It also provides isolation between multiple real-time tasks that have differing performance requirements. Polling regulates the flow of traffic into the network file server. Just as flow control mechanisms, such as a leaky bucket scheme, protect network resources from large bursts, polling protects the end-system resources by regulating the frequency at which work queues are scanned and limiting the amount of work that may be performed during each scan of the round-robin schedule.

The real-time tasks are implemented as callable routines. Invoking a real-time task amounts simply to a procedure call.

Selecting a real-time task involves scanning a set of scheduling flags; for each flag that is set, the scheduler invokes the corresponding task with the assigned weight as a parameter. The real-time task is expected to process at most the number of work units equal to the task's weight that was passed to it as a parameter. At the completion of each unit of work, the real-time task opens up the "preemption window" which is used by the scheduler to run all the isochronous tasks that may have arrived in the time it took the real-time task to process one unit of work. Upon exhausting the allowed number of work units (the weight) or less, the task voluntarily returns to the scheduler. After having completed one round of scanning the flags, the scheduler switches to the general purpose class.

General purpose tasks that are ready for execution are placed on a "GP ready" queue, which is served in a round-robin fashion. If the "GP ready" queue is empty, the scheduler initiates a new round of servicing the real-time tasks. Otherwise, the scheduler starts a general-purpose quantum timer, and activates the first task from the "GP ready" queue. The task runs until it blocks or the quantum timer expires. If the task blocks, its context is saved on a wait queue and the next task from the "GP ready" queue is restored for execution. If the quantum timer expires, the scheduler saves the context of the currently running task at the end of the "GP ready" queue and switches to a new round of servicing the real-time tasks. The execution of the general-purpose tasks may be preempted one or more times by the isochronous tasks. The execution of the general-purpose class continues after each preemption until the total time spent in processing general-purpose tasks reaches the guaranteed quantum.

In the absence of isochronous tasks, the scheduler can provide guarantees on throughput and delay bounds for real-time tasks (this assumes that all requests destined for a real-time task generate a constant amount of work). A maximum service delay is the time it takes to complete one round of real-time tasks scheduling plus the general purpose time quantum. Let R denote this maximum service delay in steady state. Weights may be assigned to real-time tasks to allocate and guarantee bandwidth averaged over the maximum service delay, R. If W denotes the weight given to a real-time task (the number of units of this task, or requests, processed in one round), then the task's steady state throughput is (W/R) requests per unit time.

III. File Directory Organization

There are two basic objectives in organizing the respective tasks of the cached disk storage subsystem 23 and the data movers 21 in the network file server 20 of FIG. 1 The first and primary objective is to organize the respective tasks so that the processing load on the cached disk storage subsystem 23 is balanced with the processing load on the data movers 21. This balancing ensures that neither the cached disk storage subsystem 23 nor the data movers 21 will be a bottleneck to file access performance. The second basic objective is to minimize modifications or enhancements to the cached disk storage subsystem 23 to support network file access.

To some degree, the second objective is driven by a desire to minimize marketing and support issues that would arise if the cached disk storage subsystem 23 were modified to support network file access. The second objective is also driven by a desire to minimize the addition of processing load on the cached disk storage subsystem associated with network file access. The network file server architecture of FIG. 1 permits data mover computers 21 to be added easily until the cached disk storage subsystem 23 becomes a bottleneck to file access performance, and therefore any additional processing load on the cached disk storage subsystem associated with network file access would tend to cause a reduction in the network file access performance of a fully configured system employing a single cached disk storage subsystem.

In a preferred arrangement, the cached disk storage subsystem 23 recognizes logical block addresses. Each logical block, for example, is a 512 byte sector. The cached disk storage subsystem has a limited internal locking facility ensuring that reading or writing to a sector is an atomic operation. The cached disk storage subsystem need not be modified to provide these basic facilities. Network file access, however, requires access to the logical blocks on a file basis and not on a logical block address basis. In particular, a network file access request specifies a file identifier, an offset in the file specifying where to begin the reading or writing of data, and the amount of data to be read or written.

The information for mapping of logical block addresses of storage in the cached disk storage subsystem 23 to the network files recognized by the network clients 54 is stored in a file directory. The file directory maps a file identifier or name to a string of logical blocks comprising the file, and also records other attributes of the file, such as the file's creation date and the client that created the file; the date the file was last modified and the client that last modified the file; access restrictions upon the file, such as a password or "read only" access; and whether or not the file is presently opened by a client, and the access rights or locks granted to the client for the file or particular logical blocks of the file. At least for recovery purposes, a copy of the file directory is stored in the cached disk storage subsystem 23 corresponding to the network file data stored in the cached disk storage subsystem 23. To minimize additional loading of the cached disk storage subsystem 23, however, the cached disk storage subsystem is not involved with maintenance of the file directory, other than reading or writing specified logical block addresses of the file directory in response to conventional access commands from the data movers.

IV. Sharing Local Caches of File Access Information in Data Processors Assigned to Respective File Systems To minimize loading on the cached disk storage subsystem 23 during file access, each data mover accessing a file should have a local cache of file directory information for the file down to a logical block level of granularity. For more uniform distribution of the loading on the data movers, the network clients should have the capability of accessing each file through more than one data mover. However, if the local cache of file directory information is replicated among the data movers, there would be a need for a cache consistency scheme to ensure that replicated read-write file access information, such as locking information, would be consistent in the caches of the data movers. Therefore, a scheme has been devised to avoid the replication of read-write file access information in the local caches of the data movers, and to permit load balancing of the read-write file access information among the local caches of the data movers without substantial disruption of ongoing access operations.

In accordance with a basic aspect of the invention, each file is assigned to a respective one of the data movers, and this respective one of the data movers, which will be referred to as the data mover owning the file and having a primary relationship to the file, governs access to the file in the cached disk storage subsystem. However, any one of a number of data mover may receive from a client a request for access to each file. If the data mover receiving the access request is primary with respect to the file, it processes the request and accesses the file in the cached disk storage subsystem. If the data mover receiving the access request is not primary with respect to the file, this "secondary" data mover forwards the access request to the primary data mover so that the primary data mover may satisfy the client's request by accessing the file. Preferably, the secondary data mover checks the access request for authentication of the request and for authorization of access to the file, and if the request cannot be authenticated and authorized, the secondary data mover rejects the request and therefore does not forward it to the primary data mover. Preferably, the primary data mover returns an acknowledgement of the request and any other results of the data access request to the secondary data mover for return to the client.

Figure 7:
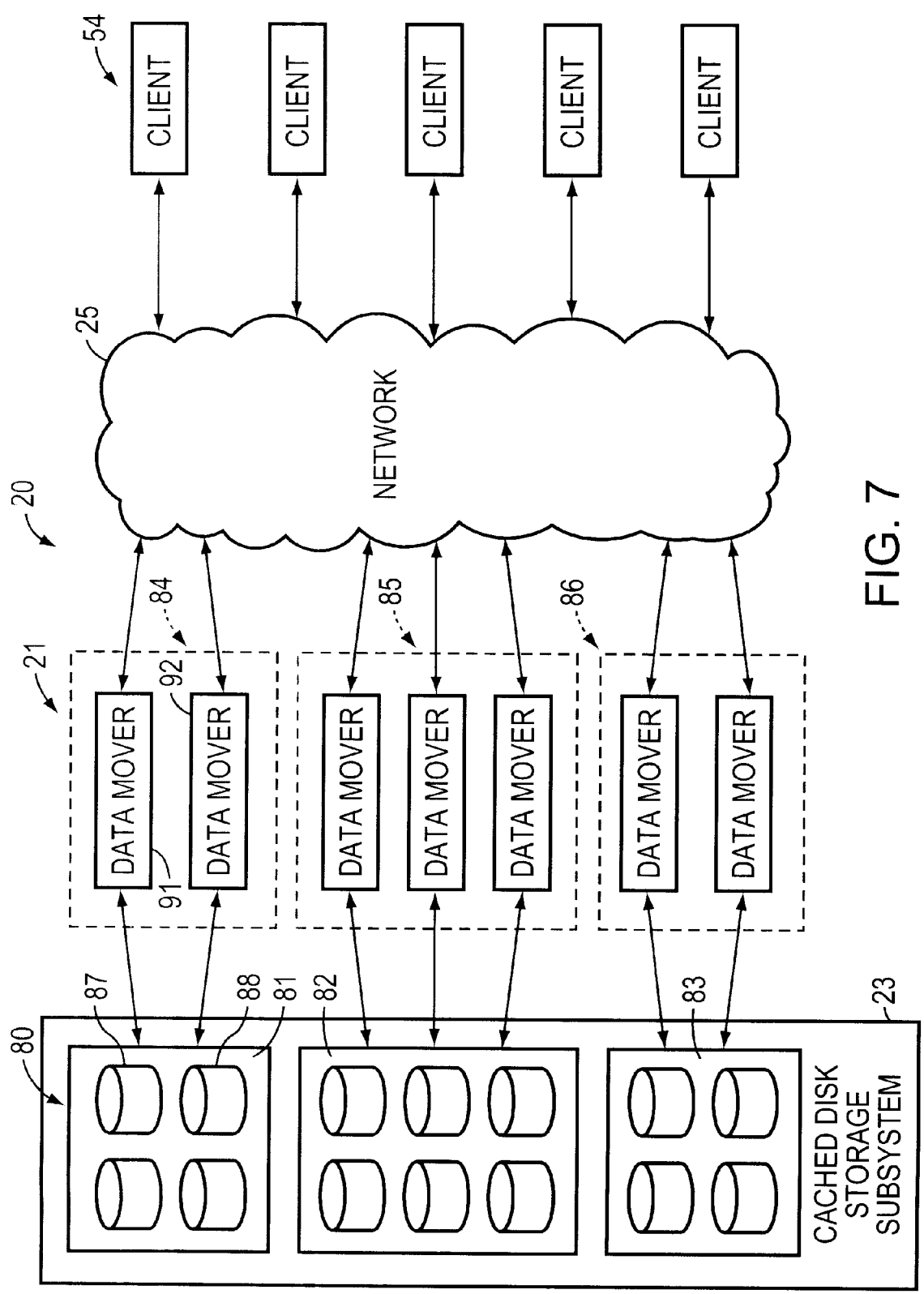
FIG. 7 is a block diagram of a data access model of the network file system of FIG. 1 programmed for read-write sharing of file systems by respective clusters of data movers.

Referring to FIG. 7, there is shown a data access model of the network file server 20 when programmed for read/write sharing of file systems by clusters of data movers 21 and file systems 80 in the network file server. A file system is simply a definite set of files. In NFS, files are indexed in a file directory organized as a tree, and in the following description of the preferred embodiments, it will be assumed that each file system is identified by a node in the tree. A reader unfamiliar with NFS should review Network Working Group, "NFS: Network File System Protocol Specification," Sun Microsystems, Inc., Request for Comments (RFC) 1094, March 1989, incorporated herein by reference.

The file systems 80, for example, include three sets of files systems 81, 82, 83, and each set is accessible to network clients 54 via an associated set of the data movers 21. In particular, all of the files in the file system set 81 are accessible to the clients via each of the data movers in the data mover set 84, all of the file systems in the file system set 82 are accessible to the clients via each of the data movers in the data mover set 85, and all of the files in the file system set 83 are accessible via each of the data movers in the data mover set 86. The union of each file system set and its associated data mover set will be referred to as a cluster. By including more than one data mover in each cluster, each read-write file system is accessible via more than one data mover so that data availability is not compromised.

There is, however, a cost associated with giving client access to a read-write file system via multiple data movers, primarily due to management of file locks. Read-only file systems avoid the costs of managing file locks, and therefore it is feasible to permit each data mover to service client read-only requests and to directly access any read-only file system in the cached disk storage subsystem. For read-write file systems, however, it is desirable to limit the number of data movers that can directly access the files in at least some of the read/write file systems, by defining a cluster of file systems and associated data movers through which a client can access the file systems. Therefore, in the logical configuration of FIG. 7, each read-write file system and each data mover may belong to only one cluster. A read-only file system may belong to multiple access clusters. Exports are cluster-wide; that is, all data movers in each cluster provide the same access to each file system in the cluster. Each file system in the cluster can be accessed via a client directly or via another server at multiple access points known in NFS as "mount points," as will be further described below.

To limit the cost associated with providing access to a read/write file system via a plurality of data movers in a cluster, each read/write file system in the cluster is assigned one and only one of the data movers in the cluster to be a primary data mover with respect to the file system. This primary data mover has an exclusive ownership relationship to each file in the read/write file system, and has the exclusive right to directly access data in each file in the read/write file system. The primary data mover manages the read and write locks on the files in the file system. For example, in FIG. 7, the data mover 91 is the owner of the file system 87, and the data mover 92 is the owner of the file system 88. However, as will be further described below, the display and keyboard server (28 in FIG. 1) can change dynamically the file system ownership by the data movers.

Each of the data movers in a cluster has a directory of the file systems in the cluster and a data base of the mount points for the file systems and the data mover owner of each read-write file system. When any data mover in a cluster receives a request for access, it checks the data base, and if it finds that the file system is a read/write file system having a different primary data mover, then the data mover forwards the client request to the primary data mover. Read requests, write requests, mount requests, and lock requests are examples of data access requests that are forwarded to the primary data mover for the file system to be accessed. If a data mover receives a request for access to a file system in the cluster and finds that the request is a read-only request or the data mover finds that it is the primary data mover for the file system, then it accesses the file system directly. Look-up of the file name in the file directory and management of access authorization for a file system can be distributed between a secondary data mover that receives and interprets a client request for access to the file system and the primary data mover that manages the locks on the file system.

Figure 8:
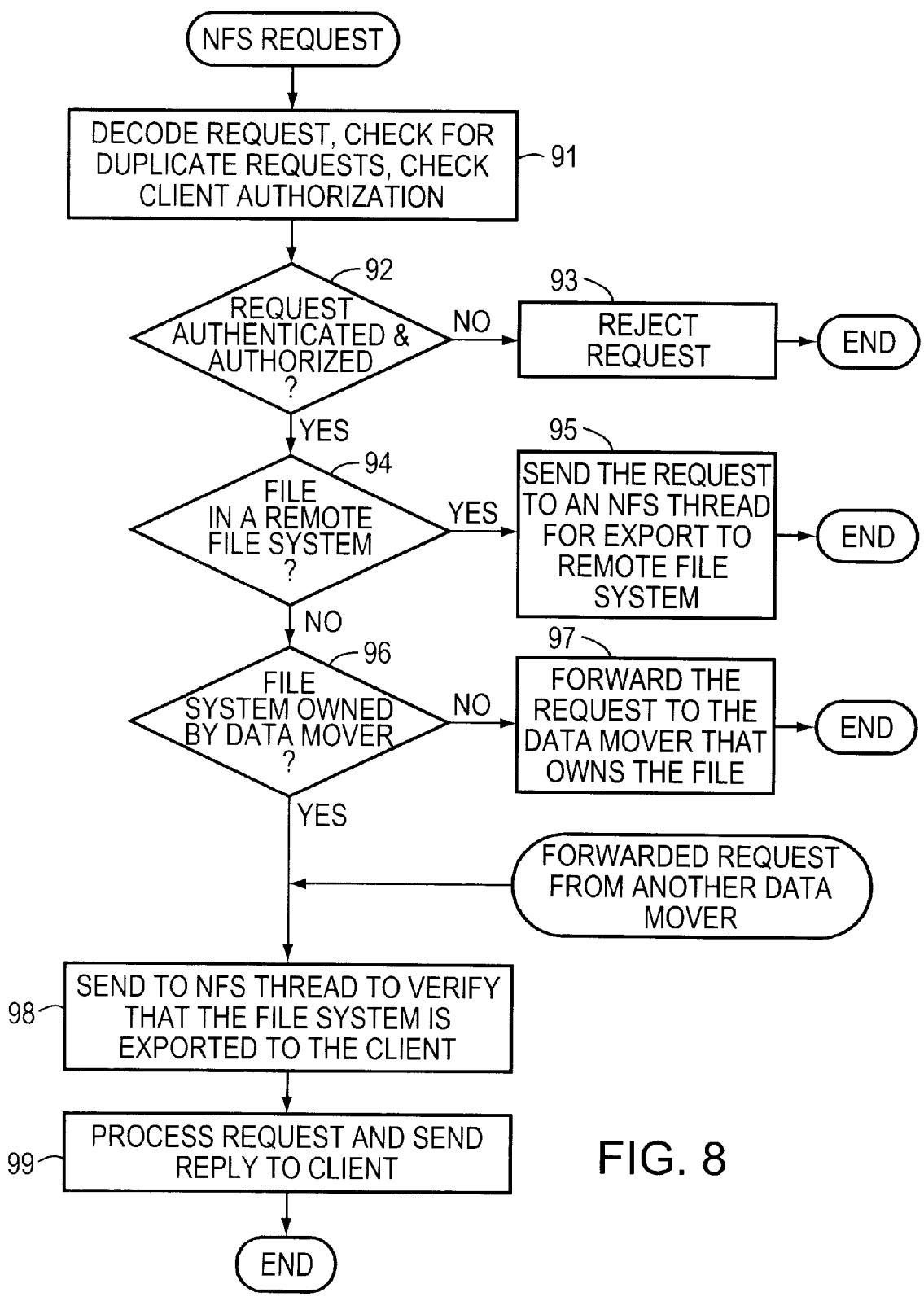
FIG. 8 is a flowchart showing a basic method of processing of client file access requests in accordance with the data access model of FIG. 7.

Referring to FIG. 8, there is shown a basic flowchart for the processing by a data mover of an NFS request from a client in accordance with the data access model of FIG. 7. In a first step 91, the data mover receiving the NFS request decodes the request to verify the RPC portion of the request, checks a cache of previously received requests to eliminate any duplicate request, and checks the client's authorization for the desired access. If the request is not authenticated and authorized, as tested in step 92, then execution branches to step 93 to reject the request. Otherwise, execution continues from step 92 to step 94.

In step 94, execution branches to step 95 if the file for which access is requested is in a remote file system. This occurs if a "mount point"is reached during file look-up as the file name, which is a path through the directory tree, is traversed from the root of the tree to the file be accessed. In step 95, the data mover sends the request to an NFS thread for export to the remote file system corresponding to the "mount point." If the remote file system is in the cached disk storage subsystem (23 in FIG. 7), then the mount request is exported by forwarding it to the data mover that is the owner of the file system of the "mount point." If the process of file-name path traversal ends at the file to be accessed without ever reaching a "mount point," then execution continues from step 94 to step 96.

In step 96, execution branches to step 97 if the file to be accessed is in a file system owned by a data mover different from the data mover that received, authenticated and authorized the client request. In step 97, the data mover having received the client request forwards the request to the data mover that owns the file system. If the file to be accessed is in a file system owned by the data mover that received, authenticated, and authorized the client request, then execution continues from step 96 to step 98. Step 98 is also reached when another data mover forwards an authenticated and authorized request for access to a file that is owned by the data mover that is executing the program represented by the flowchart in FIG. 8.

In step 98, the data mover sends the request to an NFS thread to verify that the file system is exported to the client. Then in step 99 the data mover processes the request (for example reads or writes data to the file) and sends a reply to the client.

Figure 9:
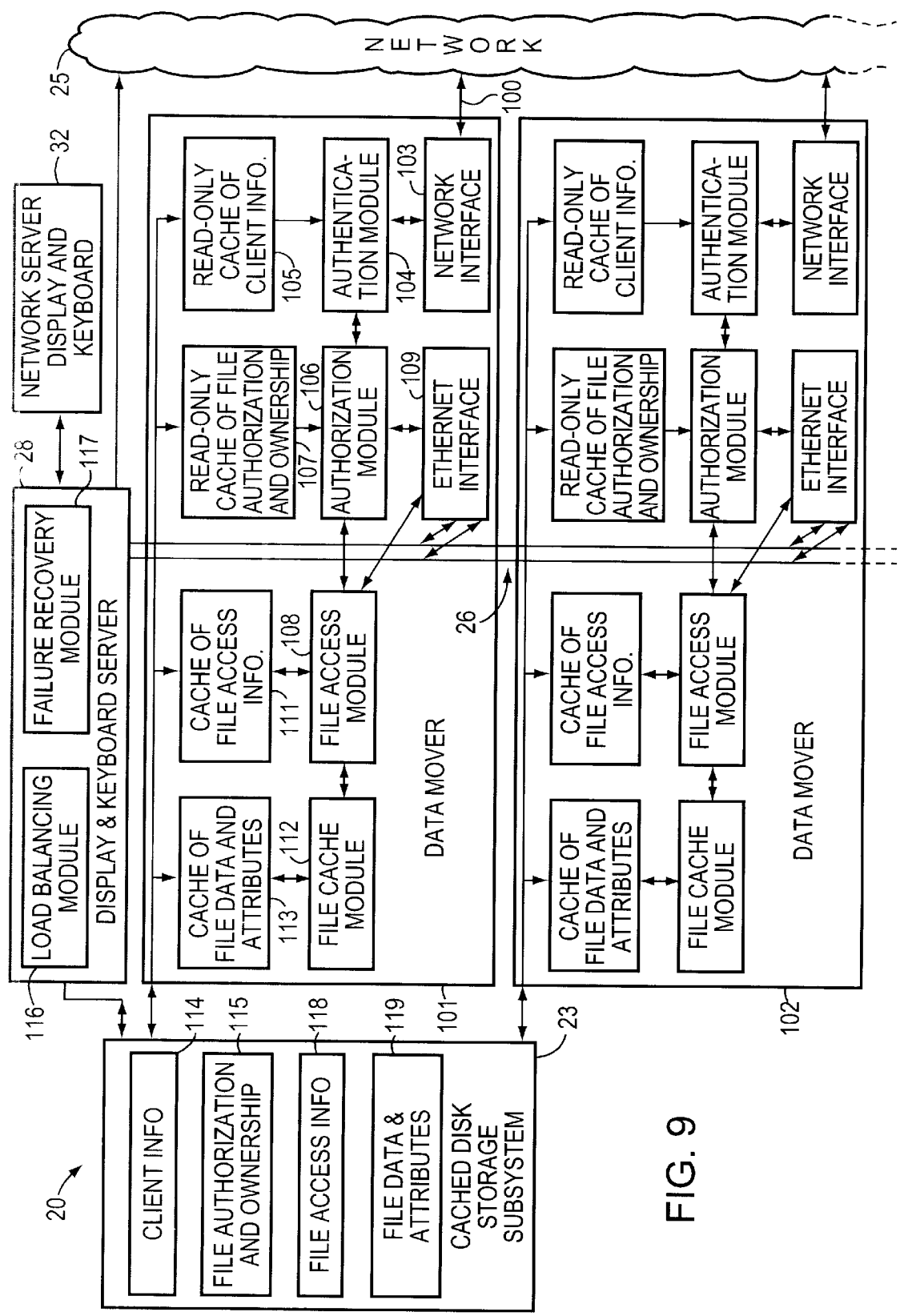
FIG. 9 is a block diagram showing program modules and data structures in the cached disk storage subsystem, a display and keyboard server, and two data movers of the network file server of FIG. 1.

Referring now to FIG. 9, there is shown a preferred organization of caches and program modules in the network file server 20. In FIG. 9, only one display and keyboard server 28 and only two other data movers 101, 102 are shown. It should be understood that the network file server 20 would include the second display and keyboard server (29 in FIG. 1) as well as additional data movers and optionally the tape silo (24 in FIG. 1). The second display and keyboard server would include program modules similar to the program modules in the display and keyboard server 28 as shown in FIG. 9. Each of the two display and keyboard servers could also be programmed with caches and modules similar to the caches and modules show in the data movers 101 and 102 in FIG. 9. Each of the additional data movers would also include caches and program modules similar to the caches and program modules shown in the data movers 101 and 102 in FIG. 9.

The data mover 101 has a network interface 103 representing the programming of the data mover for obtaining file access requests from clients in the data network 25. Therefore, the network interface 103 includes the network link drivers 72, the System V Stream 73 and the communication stacks 74 shown in FIG. 5. The network interface 103 forwards the file access requests to an authentication program module 104 in the data mover 101.

The authentication module 104, authorization module 106, file access module 108, and file cache module 112 perform functions of the NFS file access protocols, VFS common file system 71, and the UFS physical file system. In general, the authentication module 104 incorporates NFS command decoding procedures and operating system type client authentication procedures, the authorization module 106 incorporates NFS file access authorization procedures, and the file access module 108 and file cache module 112 incorporate VFS and UFS file system procedures for executing NFS commands. However, the modules are organized not to achieve a one-to-one correspondence with NFS, VFS and UFS but to pipeline the functions of NFS, VFS, and UFS in such a way as to practice the method of the present invention and to permit simultaneous execution of the pipelined functions for different data access requests by pipelined data processors.

The authentication module 104 attempts to authenticate the client request to determine generally what file access rights the client has. In particular, the authentication module 104 accesses information about the client from a read-only cache of client information 105. Once the client request is authenticated, it is passed on to an authorization program module 106.

The authorization module 106 accesses a read-only cache of file authorization and ownership information 107 to obtain information about the file to be accessed. If the client does not have sufficient authorization for the requested file access, then the authorization module rejects the request. Otherwise, ownership information from the read-only cache 107 indicates which of the data movers 101, 102, etc., is the owner of the file to be accessed. If the data mover 101 is the owner of the file to be accessed, then the authorization module 106 passes the request to a file access module 108 in the data mover 101. Otherwise, the authorization module 106 passes the request to an Ethernet interface 109 which transmits the request over the dual redundant internal Ethernet link 26 to an Ethernet interface and file access module in the data mover that is the owner of the file to be accessed.

The file access module 108 accesses a cache 111 of file access information in order to determine whether file access is precluded by a read or write lock owned by another client. In other words, the file access module 108 functions as a lock manager for the files systems owned by the data mover 101. When access to the file is not precluded by a lock owned by another file, the file access module 108 may grant access to the client presently requesting access, and if access is granted, the file access module passes the request to a file cache module 112.

The file cache module 112 functions as a file system cache manager for managing a cache of file and data attributes 113. The file cache module permits the client to perform asynchronous data access operations for a transaction upon the data and attributes in the cache 113 without writing new data down to the cached disk storage subsystem 23 until a transaction is to be committed. Such asynchronous write operations, for example, are permitted in NSF version 2.

The file cache module 112 and cache of file data and attributes 113 also solves a data security problem that might otherwise occur for asynchronous operation where data and attributes may be written by the client in any order to the network file server. The new file data for a transaction is always written from the data mover to the cached disk storage system before the new file attributes. Otherwise, if new file attributes were to be written to the cached disk storage subsystem and the data mover were to fail before writing the new file data, the new file attributes could point to old file data of a file owned by a different client, which might permit the old file data to be accessed by a client without authorization during a recovery operation.

The caches 105, 107, 111 and 113 in the data mover 101 cache data stored in the cached disk storage subsystem 23. The read-only cache of client information 105 caches client information 114. This information is maintained by a network administrator accessing the display and keyboard server 28 by SNMP commands from the network 25 or by SNMP commands from the network server display and keyboard 32.

The read-only cache of file authorization and ownership 107 caches file authorization and ownership information 115 stored in the cached disk storage subsystem 23. The file authorization information originates from a particular client that first created the file, although the file authorization information could be changed by the system administrator or another client having authority to change the file authorization information. The file ownership information includes an indication that a particular data mover owns the file, and this data mover ownership originates from the display and keyboard server 28.

The cache of file access information 111 caches file access information 118 stored in the cached disk storage subsystem 23. The cache of file access information 111 functions as a write-back cache in response to client requests that are commit requests. Synchronous write requests and close file requests are examples of commit requests. The file access information in the cache 111 normally originates from its associated file access module 108 unless file ownership is changed by the load balancing module 116 of the display and keyboard server 28, or by the failure recovery module 117 of the display and keyboard server.

The cache of file data and attributes 113 caches file data and attributes from the file data and attributes 119 stored in the cached disk storage subsystem 23. The cache 113 of file data and attributes functions as a write-back cache in response to client commit requests.

Although the file access information 118 and file data and attributes 119 stored in the cached disk storage subsystem 23 are cached in the caches of the multiplicity of data movers, there is not a cache coherency problem because the information for each read-write file at any given time normally resides only in one of the data movers; namely, the data mover that is the owner of the file. Moreover, when data mover ownership of a file is in the process of being transferred to another data mover, access to the file is temporarily suspended. The exclusive data mover ownership of the files also simplifies recovery from data mover failure. The exclusive ownership of the files by the data movers does not present a substantial bottleneck to file access because load balancing can be performed dynamically before a serious bottleneck occurs.

As should be evident from FIG. 9, the exclusive ownership of files by the data movers also leads to modularization of the file access functions in such a way that the network file server could be expanded to include any number of data movers, and each data mover could be constructed using multiple pipelined processors. For example, each pipelined processor could correspond to one of the program modules in FIG. 9. The exclusive ownership of the files by respective data movers also eliminates any cache consistency problems for the use of file system caches in the data movers. The file system caches in the data movers can substantially reduce the loading on the cached disk storage subsystem by transaction processing applications.

Referring to FIG. 10, there is shown an example of the read-only cache of client information 105. For each client, the information includes a client identifier (ID), a client password, a priority level, a security level, an access group, and a network IP address. The client ID is a unique identifier to distinguish each client from other clients. A password can be assigned to a client and periodically changed in order to prevent other entities on the network from masquerading as the client. The client may have a priority level assigned to permit some clients to have priority over other clients when the clients are waiting for a lock on a file. A client may be assigned a security level in order to control access to files containing sensitive material. The client may also be a member of various access groups having access to sets of related files. Finally, a client may have an assigned network IP address.

Referring to FIG. 11, there is shown an example of the read-only cache of file authorization and ownership information 107. For each file, the information includes a file identifier, a corresponding file password, an access type, a security level, an access group, a client owner, a data mover owner, and any remote file system to which a file access request must be exported. The file ID is unique to each file. A file password may be assigned to a file to restrict access to only those entities knowing the password. A file may have a security level so that access to the file is granted to only clients having at least the security level assigned to the file. A file has an access type, such as read-write or read-only. A file may also be accessible by a particular access groups of clients, and may have one access group for read-only access and another access group for read-write access.

Each file includes at least one client owner who may delete the file and change its authorization and ownership information. Typically the client owner created the file. Each read-write file also has a data mover owner.

The data mover owner of a file is the data mover that manages the creation of the file, the locks on the file, and the exporting of file access request to any remote file system. Associated with the data mover owner in the cache of file access information is a flag SF indicating whether or not a transfer of data mover ownership is in progress, for example by the load balancing module (116 of FIG. 9).

If a file is referenced in a file system but is not local to the file system, then the file authorization and ownership information identifies a remote file system to which can be exported a client request for the file. For example, NFS file names are defined as a path through a directory tree representing the file system including the file, and a reference to a remote file system may be included at any node on the path. Nodes referencing remote file systems are called "mount points." Therefore, it is permissible for an NFS file or file system to be included by reference in a file directory of one file system, referred to as the local file system, and be located in another file system, referred to as the remote file system. To facilitate the file-name path traversal of NFS, the cache of file authorization and ownership information is organized as a hierarchical data structure corresponding to the file directory. Information such as the data mover owner included at a node of the data structure is inherited by descendant nodes in the data structure.

Referring to FIG. 12, there is shown an example of the cache of file access information 111. Associated with each file identifier is locking information including flags R and W indicating whether or not there is a read lock or write lock on the file, a list of lock owners when there is a lock on the file, and a list of any clients waiting for a lock on the file. Typically only a single client can have a write lock on a file at any given time, and a write lock precludes any other client from obtaining a read lock or a write lock on the file, or reading or writing to the file. Typically a plurality of clients may have a read locks on a file, and a read lock precludes other clients from obtaining a write lock on the file or writing to the file. Also associated with each file identifier is a "write pending" flag indicating that the locking information for the file in the cache 111 is different from the file access information (118 in FIG. 9) in the cached disk storage system and is to be written down to the cached disk storage system when a current transaction is committed.

Referring now to FIG. 13, there is shown an example of information in the cache of file data and attributes 113. Associated with each file ID are data, attributes, a write pending flag, and an abort flag. The attributes typically include the size of the file, the client owning the file, the time the file was last modified, and pointers to locations in the cached disk storage subsystem where the data resides. The write pending flags indicate whether the data or attributes have been modified during a current transaction and need to be written down to the cached disk storage subsystem or to the read-only caches of file authorization and ownership in all of the data movers when a transaction is committed. The abort flag indicates whether or not a current transaction should be aborted in response to a commit request from a client. The abort flag is used in connection with a recovery operation when a data mover failure is discovered, as will be further described below with reference to FIGS. 22 to 24.

Figure 14:
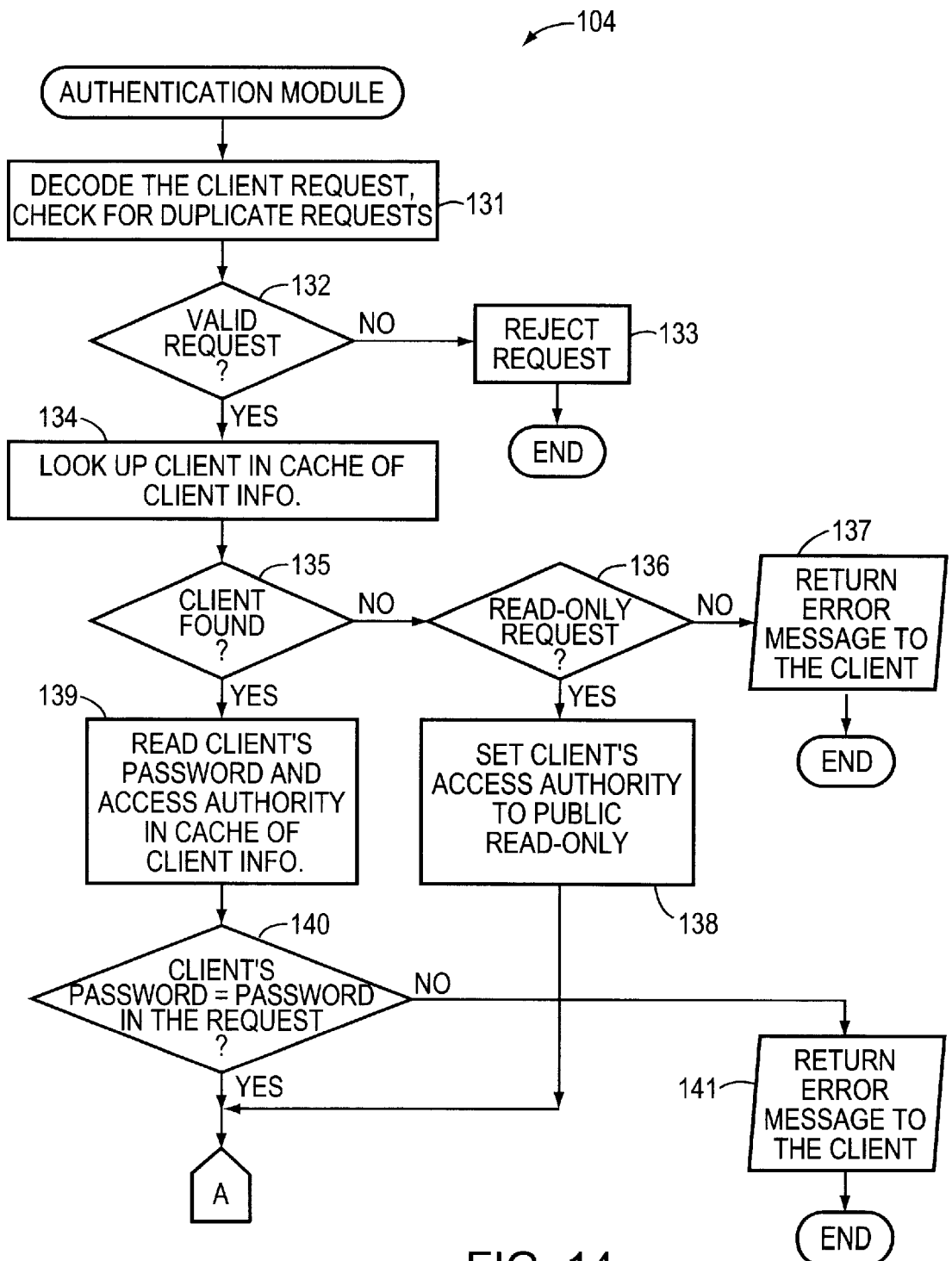
FIG. 14 is a flowchart of programming in an authentication module used in the data movers of FIG. 9.

Referring to FIG. 14, there is shown a flowchart of the authentication module 104. In a first step 131, the client's request is decoded, and a comparison is made of a cache of recently received requests in order to identify any duplicate request. The decoding process could also check whether the client's request has been corrupted during transmission. For example, a message digest or cyclic redundancy code could be computed over the concatenation of the NFS request and a client's secret password, and then the concatenation of the message digest or cyclic redundancy code and the client's password could be encrypted, and the encrypted result appended to the NFS message and transmitted as the client's request. In the decoding step 131, the encrypted value could be decrypted and used to check for any tampering with the NFS request or the client's secret password. This technique, for example, is disclosed in an experimental protocol for Internet security described in Network Working Group, G. Welters, Editor, "User-Based Security Model for SNMPv2," RFC 1910, February 1996, incorporated herein by reference. The decoding step 131 then decodes the RPC portion of the NFS request to determine the nature of the request. If the request is found not to be valid, as tested in step 132, then the request is rejected in step 133. Otherwise, execution continues to step 134.

In step 134, the data mover looks up the client in the cache of client information. If an entry for the client is not found, as tested in step 135, and the client is requesting something other than a read-only access, as tested in step 136, then in step 137, the message is rejected and an error message is returned to the client. If an entry for the client is not found in step 135, but the client is requesting a read-only access as tested in step 136, then execution branches to step 138 to set the client's access authority to public read-only. In other words, if a client is not known to the network file server, it may only perform a read-only access of a public file.

If an entry for the client is found in the cache of client information, then execution continues from step 135 to step 139. In step 139, the client's password and access authority are read from the read-only cache of client information (105 in FIG. 9) in order to perform permission checking for the data access. The NFS protocol, strictly speaking, does not define the permission checking used by servers. However, a typical permission checking method uses the AUTH_UNIX style authentication. The server gets the client's effective "uid", effective "gid", and groups on each call and uses them to check permission.

In the example of FIG. 14, in step 140, the client's password from the cache of client information is compared to the password in the client request. If there is not a match, then execution branches from step 140 to 141 to reject the request and return an error message to the client. In other words, if there is a match, execution continues from step 140 to step 151 in FIG. 15.

Figure 15:
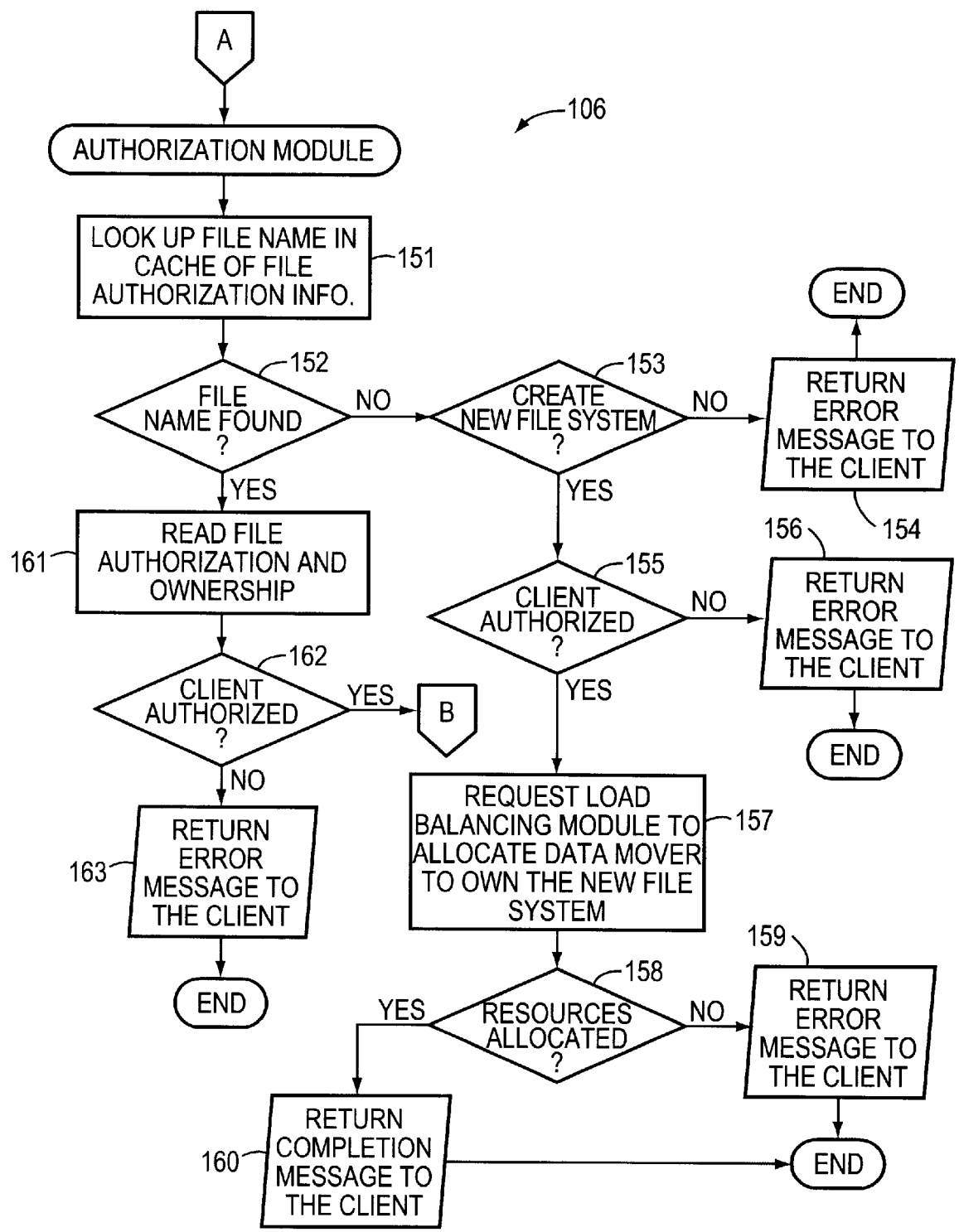
FIG. 15 is a first portion of a flowchart showing programming in an authorization module used in the data movers of FIG. 9.

Referring to FIG. 15, there is shown a flowchart of the authorization module 106. In a first step 151, the data mover looks up the file name in the read-only cache of file authorization and ownership (107 in FIG. 9). If the file name is not found, as tested in step 152, then execution branches to step 153. In step 153, the data mover checks whether the client request is a request to create a new file system. If not, then the request is invalid because it requests access to an unknown file or the creation of a new file in an unknown file system, and therefore execution branches to step 154 to reject the request and return an error message to the client. If the request is a request to create a new file system, then execution branches to step 155. In step 155, the data mover checks the client's access authority (i.e., the client's security level and access group) to determine whether the client is authorized to create a new file. If not, then execution branches to step 156 to reject the request and return an error message to the client. Otherwise, if the client is authorized to create a new file, then execution continues from step 155 to step 157.

In step 157 the data mover requests the load balancing module (116 in FIG. 9) in the display and keyboard server 28 to allocate a data mover to own the new file system. If the load balancing module cannot find sufficient resources to allocate, as tested in step 158, then execution branches to step 159 to reject the request and return an error message to the client. Otherwise, if sufficient resources are allocated for the new file system, then execution continues from step 158 to step 160 to return a message to the client indicating that the request has been successfully completed.

If the file name in the client request is found in the read-only cache of file authorization and ownership information (107 in FIG. 9), then execution continues from step 152 to step 161. In step 161 the data mover reads the file authorization and ownership information from the cache, and compares it to information in the client request in order to determine whether the client is authorized to perform the requested file access. In particular, the authorization module compares the access type of the file to the access requested by the client, compares any file password for the file to any file password in the client's request, compares the security level of the file to the security level of the client, and compares the access group and owner of the file to the client's access group and client identifier.

If the client is not authorized to perform the requested file access, as tested in step 162, then execution continues to step 163 to reject the request and return an error message to the client. Otherwise, if the client is authorized, execution branches from step 162 to step 171 in FIG. 16.

Figure 16:
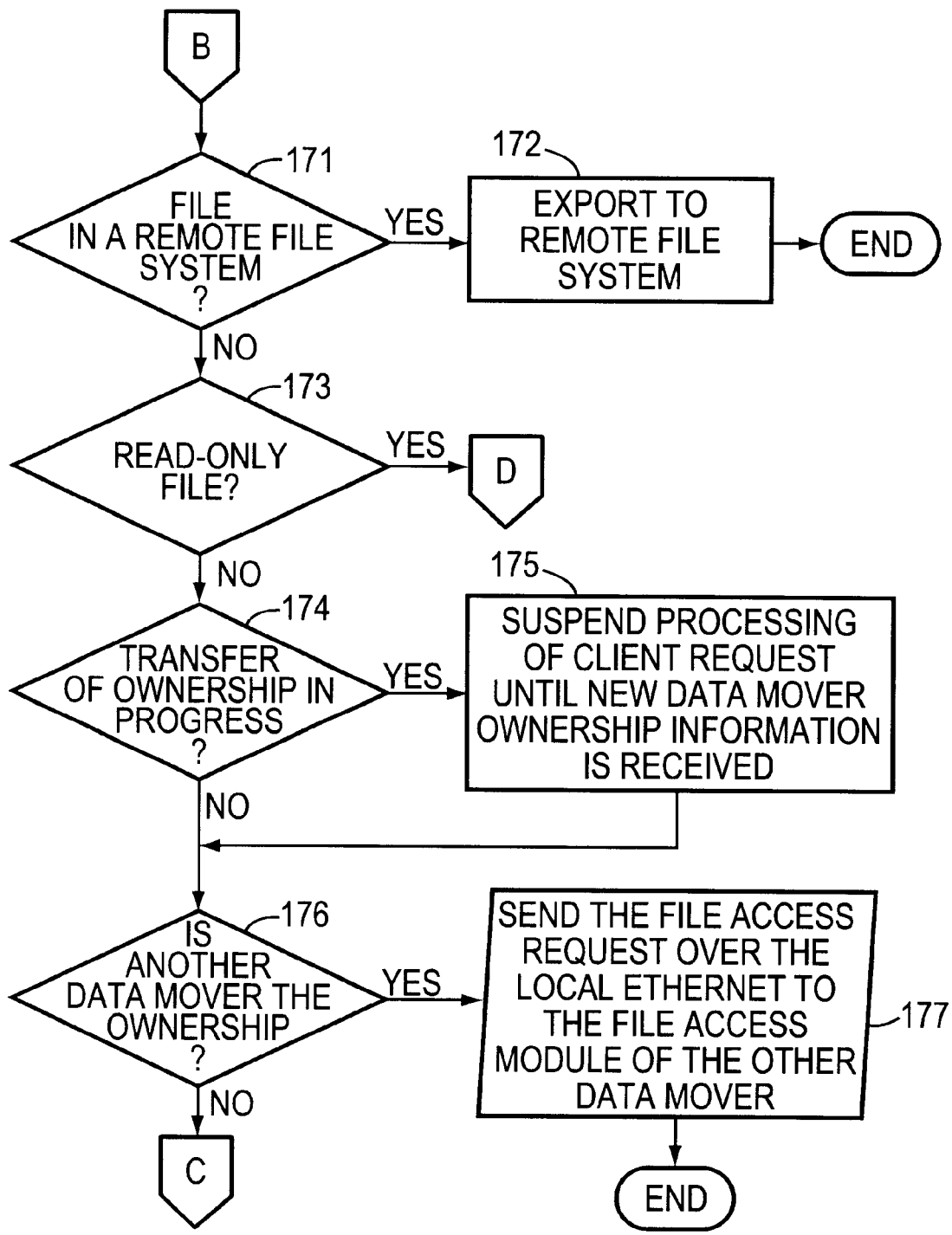
FIG. 16 is a flowchart showing programming in the authorization module for routing a client request from the data mover having received the client request to the data mover that is the owner of the file for which access is requested.

Referring to the continued flowchart in FIG. 16, in step 171 the data mover checks whether the file is in a remote file system. If so, then execution branches to step 172 to export the request to the remote file system indicated in the read-only cache of file authorization and ownership information (107 of FIG. 9).

Although steps 152 to step 171 have just been described with reference to a search for a file name, in the NFS protocol the file name is in the form of a path name in a directory tree, and steps 152 to 171 are in effect repeated at each node while traversing the path name beginning with the file system name at the root of the directory tree. Execution branches from step 171 to step 172, for example, at a node which is defined in the read-only cache of file authorization and ownership as a "mount point."

If the entire path name is traversed without reaching such a "mount point", then execution continues from step 171 to step 173 indicating that the client's request has been authenticated and the client is authorized to access the file. If the file has an access type of read-only, as tested in step 173, then execution branches to step 180 of FIG. 17 to begin file access. However, for a read-write file, access at the present time could be precluded because another client could hold a lock on the file that is inconsistent with the access presently requested.

The management of the file locks is done only by the data mover owning the file to be accessed. This data mover owner of the file is indicated in the read-only cache of file authorization and ownership information 107, and constitutes part of the file authorization and ownership information read by the data mover in step 161 of FIG. 15. However, the request should not be immediately transferred to the primary data mover if a transfer of data mover ownership is in progress. Such a transfer of ownership will be further described in FIG. 21, and the presence of a transfer of ownership in progress is indicated by the flag SF associated with the file in the read-only cache of file authorization and ownership (107 in FIG. 11). If in step 174 the flag SF is found to be set, indicating that such a transfer of data mover ownership is in progress, then execution branches to step 175 to suspend processing of the client's request until new data mover ownership information is received from the load balancing module (116 in FIG. 9) as will be further described with reference to FIG. 21.

If no transfer of data mover ownership is found to be in progress in step 174, or once the transfer of ownership has been completed, then execution continues from step 174 or step 175 to step 176. Step 176 checks whether the data mover having received the client request is the owner of the file for which access is requested. If another data mover is the owner, then execution branches from step 176 to step 177 to send the file access request over the local Ethernet (26 in FIG. 9) to the file access module of the other data mover, and processing of the client request is continued by the file access module of the other data mover. Otherwise, if the data mover having received the client request is the owner of the file for which access is requested, execution continues from step 176 to step 180 of FIG. 17.

Figure 17:
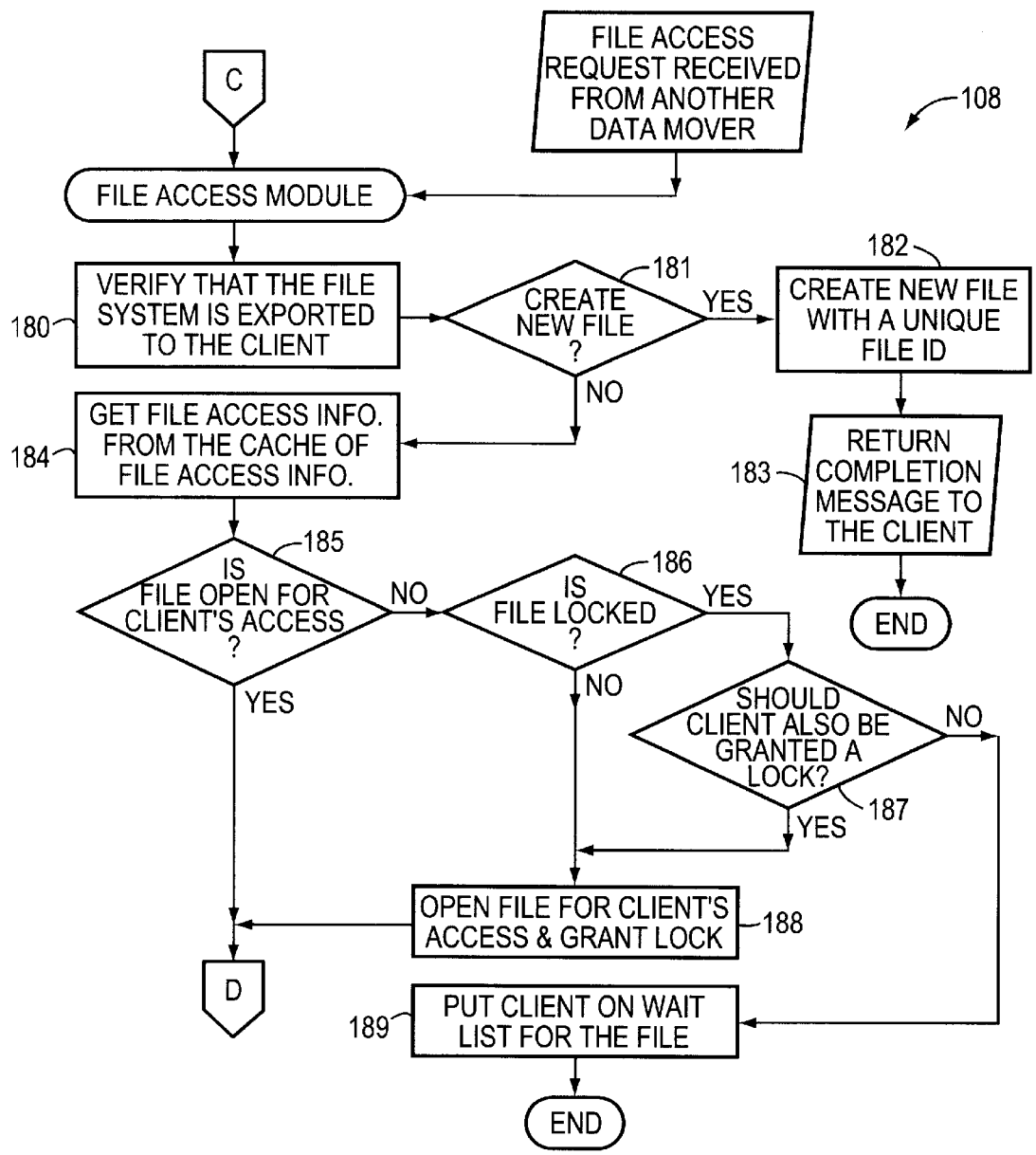
FIG. 17 is a flowchart showing programming in a file access module in the data movers of FIG. 9.

Referring to FIG. 17, there is shown a flowchart of the file access module 108. In a first step 180, the data mover verifies that the file system is exported to the client. Next, in step 181 the data mover checks whether the request is a request to create a new file or new file name for an existing file. If so, execution branches to step 182 to create a new file with a unique file ID or to change the file name to a unique file name. Creation or renaming of files is done in the file access module by the data mover owning the file system of the file instead of in the authorization module to ensure that no two different data movers will simultaneously create two different files having the same file name. For example, the client request specifies a desired file name, and in step 182 the data mover checks that the desired file name is not the name of an existing file. Then in step 183 the data mover returns completion message to the client indicating whether or not the request was completed successfully.

If the client request is not a request to create a new file or a rename a file, execution continues to lock management beginning in step 184. In step 184 the data mover obtains the locking information for the file to be accessed from the cache of file access information (111 in FIG. 9). In particular, the data mover looks up the file name in a directory of the cache to determine whether the locking information for the file is in cache and if so where in the cache, and if locking information for the file is not in the cache, the locking information is read from the cached disk storage system and written to the cache in the data mover. Then in step 185 the data mover checks whether the file is open for the access requested by the client; in other words, the file should be subject to a lock consistent with the client access and the client should have ownership rights with respect to the lock. If not, execution branches from step 185 to step 186.

In step 186, execution branches to step 187 if the file is locked. In step 187, execution branches to step 188 to open the file for the client's access and to grant a lock if the client should be granted a lock to open the file for the client's access. For example, if the client has a read lock on the file and would like to perform aL read-write operation on the file, then the client's read lock may be promoted to a write lock so long as other clients do not also have a read lock on the file and so long as a higher priority client is not waiting for a write lock on the file. If the client should not be granted a lock to open the file for the client's desired access, then execution continues from step 187 to step 189. In step 189, the client is placed on a wait list for the file.

If in step 186 the file is not locked, then execution continues from step 186 to step 188 to open the file for the client's access and to grant the client an appropriate lock on the file. If the file is found to be open for the client's access in step 185 or the file is opened for the client's access in step 188, then execution continues to step 191 in FIG. 18.

Figure 18:
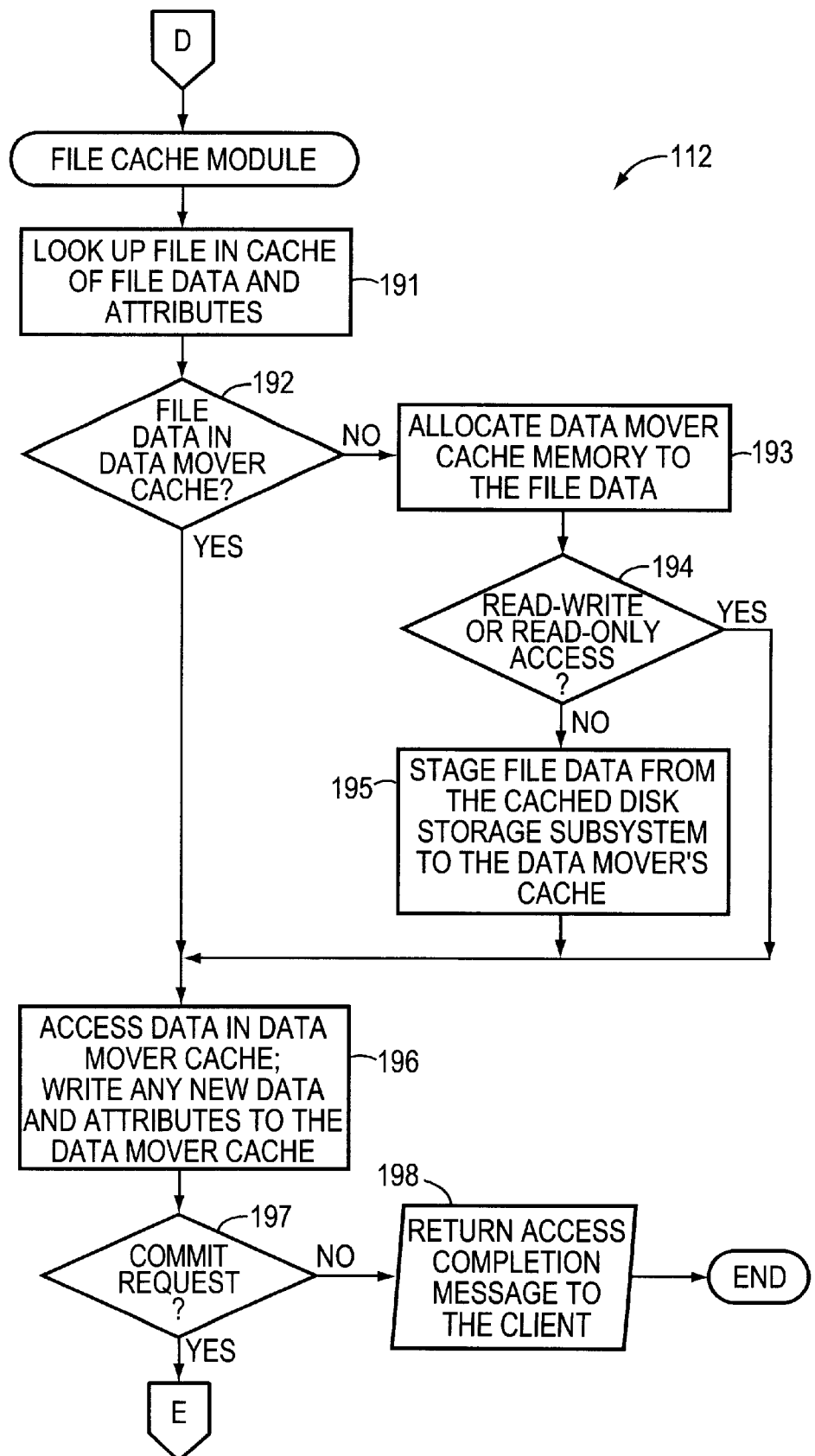
FIG. 18 is a first portion of a flowchart showing programming in a file cache module in the data movers of FIG. 9.

Referring to FIG. 18, there is shown a flowchart of the file cache module 112. In a first step 191, the data mover looks up the file in the cache of file data and attributes. If memory in the data mover's cache of file data and attributes is not allocated to the file or portion of the file to be accessed, as tested in step 192, then execution branches to step 193. In step 193, the data mover allocates data mover cache memory to the file data specified by the client request, and in step 194 execution branches depending on whether the request is for a read-write or read-only. If not, then in step 195 the file data specified by the request is fetched from the cached disk storage subsystem and written to the data mover's cache of file data and attributes.

If in step 192 the file data is found in the data mover cache, then execution continues to step 196. Execution also continues to step 196 after step 195 and after step 194 when the data mover finds that the client is requesting write-only access.

In step 196, the data mover accesses the data in the data mover cache of file data and attributes, and the data mover writes any new file data and attributes to the data mover cache, and sets write-pending flags for these new file data and attributes. Then in step 197 execution branches depending on whether the client request is a commit request. If not, then in step 198 the data mover returns an access completion message to the client, but does not write any new data or new attributes down to the cached disk storage subsystem.

Figure 19:
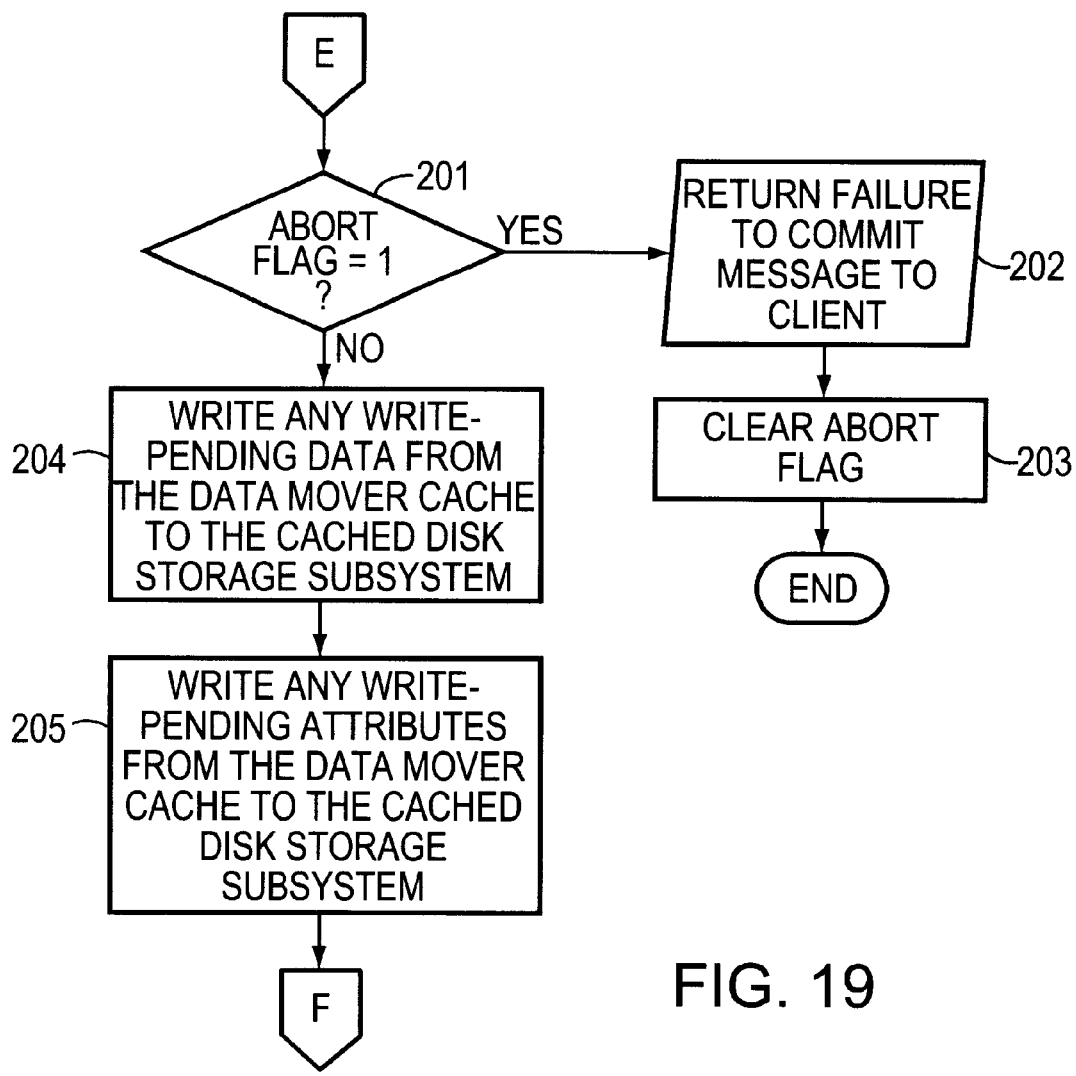
FIG. 19 is a second portion of the flowchart of the file cache module.

If the client request is a commit request, then execution continues from step 197 to step 201 in the continuing flowchart in FIG. 19. In step 201, execution branches to step 202 if the abort flag for the file is found to be set. In step 202 the data mover returns a failure to commit message to the client, and once the client acknowledges receipt of the failure to commit message, then in step 203 the data mover clears the abort flag and processing for the client request is finished.

If in step 201 the data mover finds that the abort flag is not set, then execution continues from step 201 to step 204. In step 204 the data mover writes any write-pending data of the file from the data mover cache to the cached disk storage subsystem. Then in step 205 the data mover writes any write-pending attributes for the file from the data mover cache to the cached disk storage subsystem. By writing all of the new file data to the cached disk subsystem before any of the new file attributes, a data security problem is avoided which might otherwise arise if a data mover failure were to occur during the writing of data and attributes from the data mover to the cached disk storage subsystem. After step 205, execution continues to step 206 of the file access module program in FIG. 20.

Figure 20:
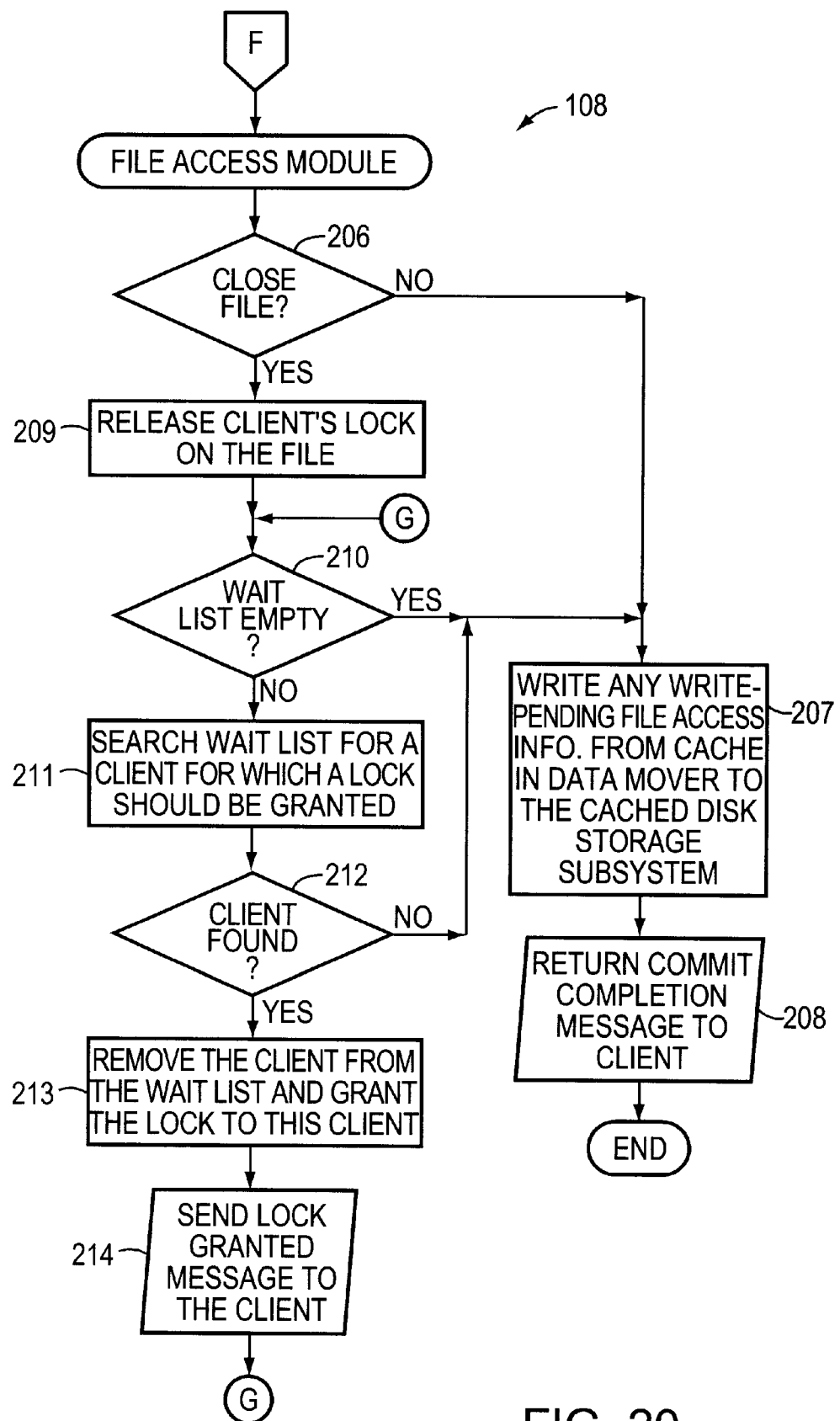
FIG. 20 is a flowchart showing programming in the file access module for servicing a wait list of clients waiting for locks on a file being closed.

In step 206 of FIG. 20, execution branches to step 207 if the commit request is not a "close file" request. In step 207 the data mover writes any write-pending file access information from the cache of file access information of the data mover down to the cached disk storage subsystem. After receiving an acknowledgement from the cached disk storage subsystem, execution continues to step 208. In step 208, the data mover returns a commit completion message to the client, and processing of the client request is finished.

Execution continues from step 206 to step 209 if the commit request is a close file request. In step 209, the data mover releases the client's lock on the file. If the wait list for the file is empty, as tested in step 210, then execution branches to step 207. Otherwise, in step 211, the data mover searches the wait list for a client for which a lock should be granted. Any lock which should be granted must be consistent with any locks presently on the file. If a lock could be granted to a number of clients on the wait list, then one of them is selected based on the positions of the clients in the wait list, their priority, and the respective durations of time with which the clients have been waiting on the list, in order to insure that all of the clients are eventually granted a lock in a fair manner. If such a client is not found, as tested in step 212, then execution branches to step 207. If such a client is found, then execution continues from step 212 to step 213 to remove this client from the wait list and grant the lock to this client. Then in step 214 the data mover sends a lock granted message to this client. Execution loops back from step 214 to step 210 until either the wait list becomes empty or no clients on the list should be granted a lock on the file.

Figure 21:
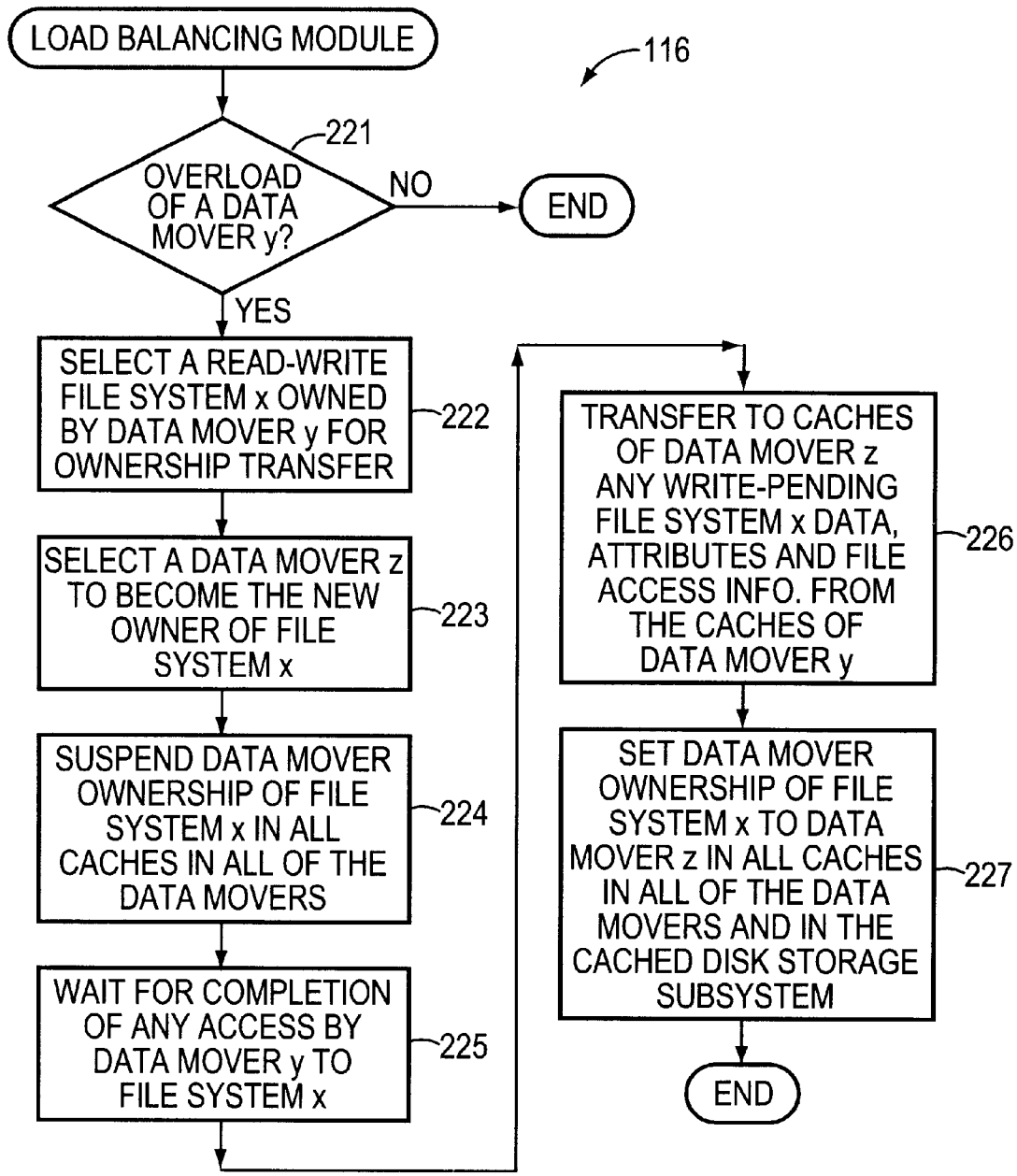
FIG. 21 is a flowchart showing programming of a load balancing module in the display and keyboard server of FIG. 9.

Referring to FIG. 21, there is shown a flowchart of the load balancing module 116 of the display and keyboard server. In a first step 221, the display and keyboard server finds that there is an overload of a particular data mover "y" because of too many access requests to the file systems that it owns. For example, when the scheduler of a data mover finds that its queue of requests to be processed by its file access module is becoming full, the data mover reports the overload to the display and keyboard server. Also, during periodic polling of each data mover for failure recovery, as described below with reference to FIG. 22, the display and keyboard server obtains the number of queued requests to the file access module in the data mover, so that a relative state of overload of the data mover with respect to the other data movers can be detected well before the queue becomes full. The authentication module of a data mover may also become overloaded by client request from the network, but this overloading cannot be solved by a change in file system ownership by the data movers, and instead is corrected upstream of the network by the clients retransmitting unacknowledged requests and the clients or switches in the network directing retransmitted requests to other data movers.

If an overload is found for the data mover "y", then execution branches to step 222. In step 222 the display and keyboard server selects a read-write file system "x" owned by the data mover "y" for ownership to be transferred. For example, the read-write file system "x" is the first read-write file system that the display and keyboard server finds in the directory of file authorization and ownership information (115 in FIG. 9). Then in step 223 the display and keyboard server selects a data mover "z" to become the new owner of the file system "x". For example, the data mover "z" is the data mover presently having the least loading. In step 224, the display and keyboard server suspends data mover ownership of the file system "x" in all of the caches in all of the data movers. This is done by setting the flag SF for the file system "x" in the read-only caches of file authorization and ownership (107 in FIG. 9 and FIG. 11) in the data movers and in the file authorization and ownership information (115 in FIG. 9) in the cached disk storage subsystem. In step 225, the display and keyboard server waits for the completion of any access by the data mover "y" to the file system "x". This is done, for example, by sending a command to the data mover "y" that would not have any priority over any commands that could have been sent to the data mover "y" from the data movers for access to the file system "x". Such a command could be a command for performing the next step 226 of transferring to the cache of the data mover "z" any write-pending data and attributes for files in the file system "x" in the cache of file data and attributes in the data mover "y". Then in step 227 the display and keyboard server 28 sets the data mover ownership of the file system "x" to the data mover "z" in all of the read-only caches of file authorization and ownership in all of the data movers of the cluster and in the cached disk storage subsystem. The suspend flag SF for the file system is cleared in each cache when the new data mover ownership for the file system is written into each cache. Shortly after the new data mover ownership for the file system is written into each cache, any client requests for access to the file system "x" that were suspended become resumed and redirected to the data mover "z". These file access requests are processed in data mover "z" just as they would have been had they been sent to the data mover "y" for file access. This process of changing the ownership of the file system "x" can be entirely transparent to the client and does not require any client requests to be retransmitted or transactions to be aborted.

Figure 22:
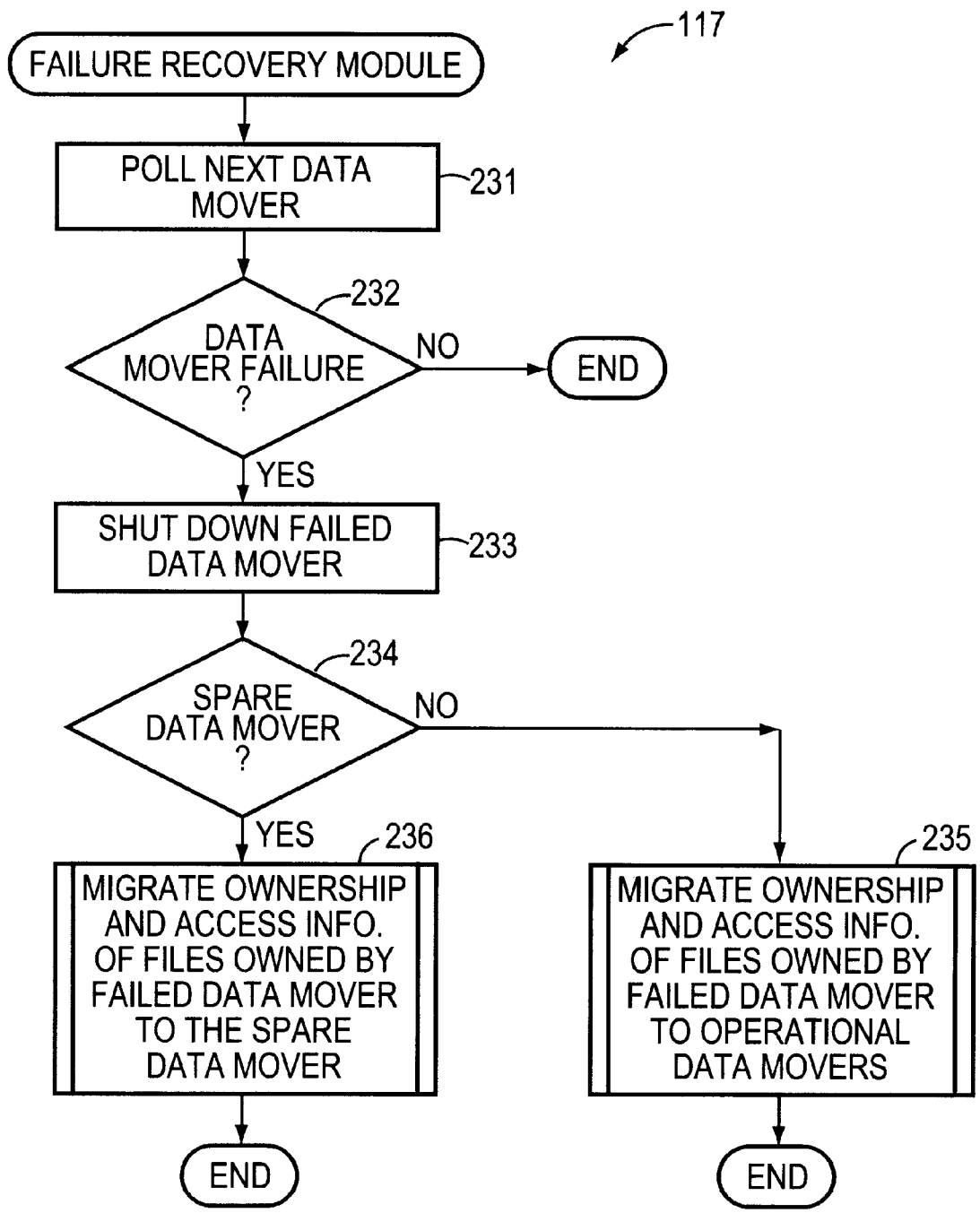
FIG. 22 is a flowchart showing programming in a failure recovery module in the display and keyboard server of FIG. 9.

Referring to FIG. 22, there is shown a flowchart of the failure recovery module 117. The failure recovery module detects a data mover failure by periodically polling the data movers. For example, in the first step 231, the display and keyboard server poles a next one of the data movers by transmitting to the data mover a sequence number. The data mover receives the sequence number, increments it, and returns it to the display and keyboard server along with a status message. The display and keyboard server checks the returned sequence number and the status message to determine whether there is a data mover failure. If there is a data mover failure, as tested in step 232, then execution branches to step 233.

In step 233 the display and keyboard server sends a message over the internal Ethernet (26) to shut down the failed data mover. Then in step 234 execution branches depending on whether there is a spare data mover. If not, then execution branches to step 235 to migrate ownership and access information of the files owned by the failed data mover to operational data movers. If there is a spare data mover, then execution continues from step 234 to step 236. In step 236, the display and keyboard server migrates ownership and access information of files owned by the failed data mover to the spare data mover.

Figure 23:
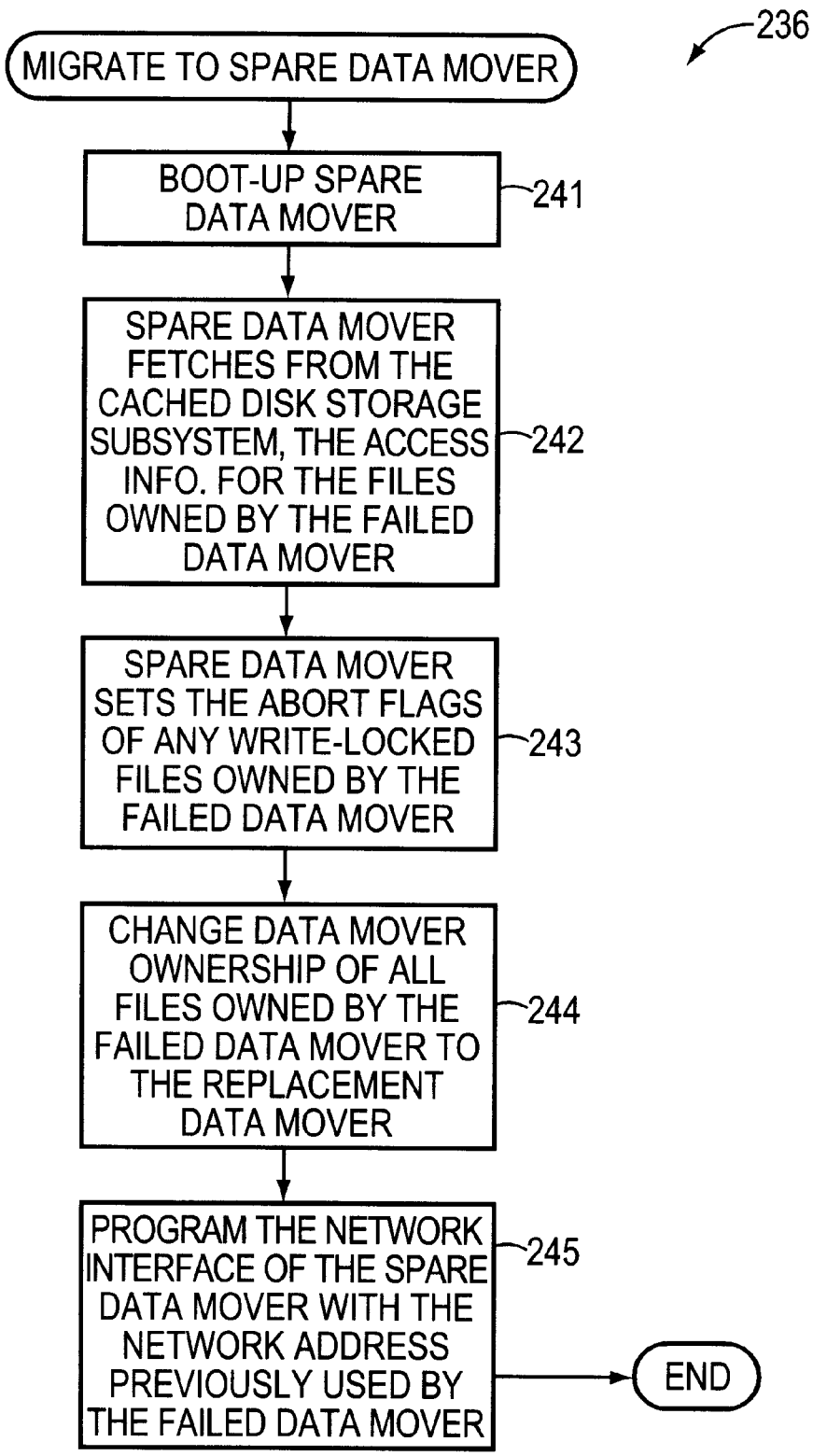
FIG. 23 is a flowchart of a subroutine called by the failure recovery module for migrating files owned by a failed data mover to a spare data mover.

Referring to FIG. 23, there is shown a flowchart of the subroutine for migrating to a spare data mover. In a first step 241, the display and keyboard server sends a signal to the spare data mover to cause the spare data mover to boot-up. Then in step 242 the display and keyboard server sends a command to the spare data mover to fetch, from the file access information (118 in FIG. 9) in the cached disk storage system, the file access information for the files owned by the failed data mover. The spare data mover loads this file access information into its cache (111 in FIG. 9) of file access information. Then in step 243 the spare data mover sets the abort flags of the write-locked files owned by the failed data mover. These abort flags are set in the spare data mover's cache (111 in FIG. 9) of file access information. In step 244, the display and keyboard server changes the data mover ownership of all files owned by the failed data mover to the replacement data mover. The display and keyboard server, for example, first changes the data mover ownership in the file authorization and ownership information (115 in FIG. 9) in the cached disk storage subsystem, and then changes the data mover ownership in the read-only cache of file authorization and ownership in each of the data movers.

Finally, in step 245, the display and keyboard server sends a command over the internal Ethernet 26 to program the network interface (103 in FIG. 9) of the spare data mover with the network address with the network address previously used by the failed data mover. The spare data mover, for example, has a standard network interface circuit card that interconnects the data processor of the data mover to a copper or fiber-optic line that is the data link (100 in FIG. 9) between the data mover (101 in FIG. 9) and the network (25 in FIG. 9). The spare data mover receives from the display and keyboard server the logical network address (IP address) and physical network address (MAC address) previously used by the failed data mover. The data processor of the spare data mover writes the physical network address (the MAC address) to a register in the standard network interface circuit card. The spare data mover uses the logical network address (the IP address) in receiving network messages in accordance with the network message protocol (the IP protocol). Therefore, the spare data mover assumes the identity of the failed data mover as seen by clients on the network.

The spare data mover, however, cannot complete any transactions that were pending at the time of failure of the failed data mover, because the data mover failure possibly caused a loss of state information including the loss of write-pending file data, write-pending file attributes, and write-pending file access information. The spare data mover sets the abort flags of the write-locked files owned by the failed data mover in step 243 in order to signal to the relevant clients the fact that the transactions have been aborted.

Figure 24:
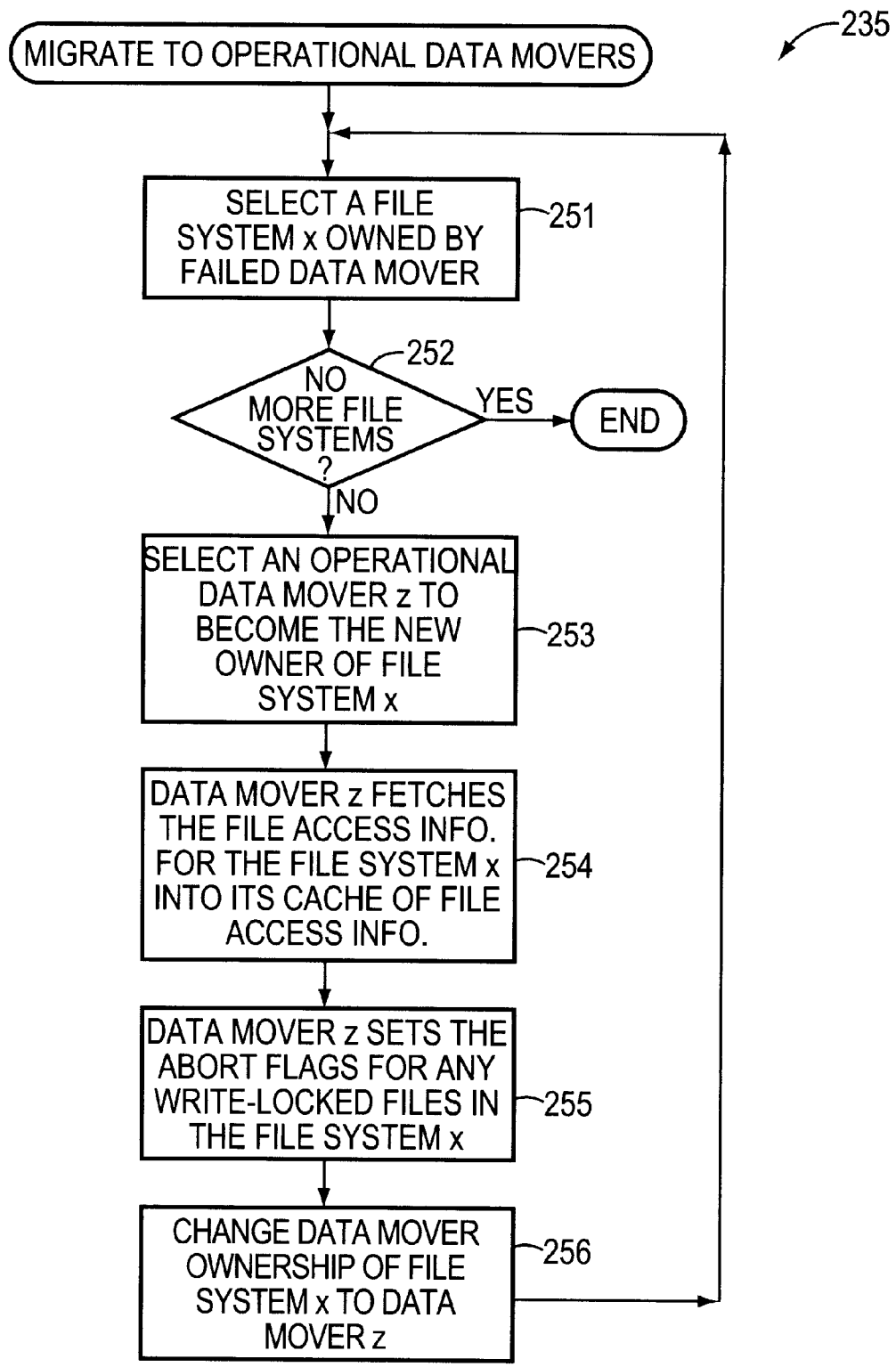
FIG. 24 is a flowchart of a subroutine called by the failure recovery module for migrating files owned by a failed data mover to operational data movers.

Referring to FIG. 24, there is shown a flowchart of the subroutine 235 for migrating ownership and access information of files owned by the failed data mover to operational data movers. In a first step 251, the display and keyboard server selects a file system "x" owned by the failed data mover. If there are no more file systems owned by the failed data mover, as tested in step 252, then the migration is finished. Otherwise, execution continues from step 252 to step 253.

In step 253, the display and keyboard server 28 selects an operational data mover "z" to become a new owner of the file system "x". Then in step 254 the display and keyboard server sends a command to the data mover "z" to cause the data mover "z" to fetch the file access information for the file system "x" into its cache of file access information. In step 255 the data mover "z" sets the abort flags for any write-locked files in the file system "x". Then in step 256 the display and keyboard server changes the data mover ownership of file system "x" to data mover "z" first in the file authorization and ownership information (115 in FIG. 9) in the cached disk storage subsystem and then in the read-only caches of file authorization and ownership in each of the data movers for the cluster including the failed data mover. Execution then loops back to step 251 to migrate all of the file systems owned by the failed data mover to other data movers in the cluster including the failed data mover.

Figure 25:
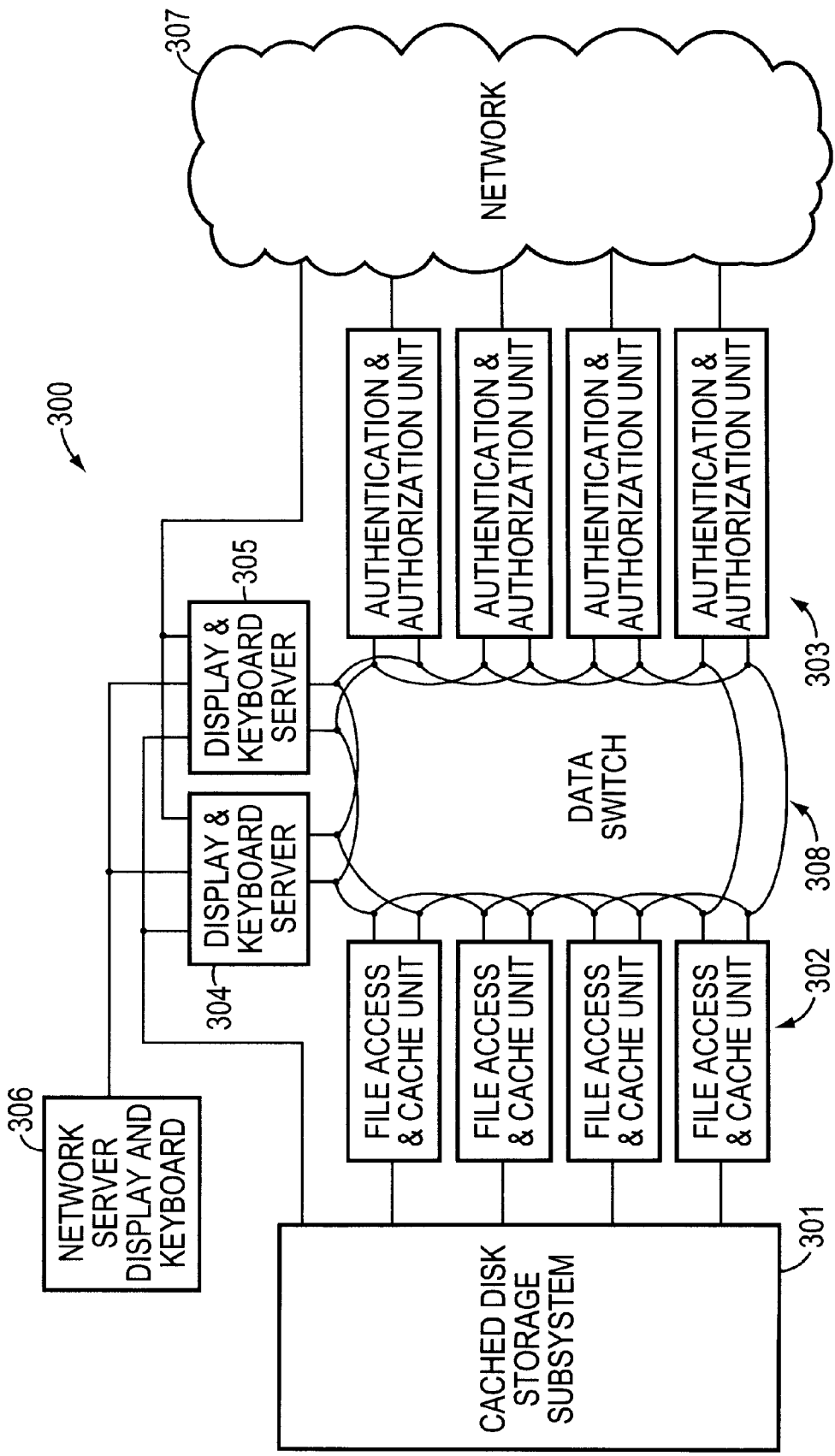
FIG. 25 is a block diagram showing an alternative implementation of a network file server employing the present invention.

The method of the present invention is applicable to various hardware architectures other than the architecture of FIG. 9. For example, an alternative construction for a network file server 300 is shown in FIG. 25. The network file server 300 includes a cached disk storage subsystem 301, a plurality of file access and cache units generally designated 302, a plurality of authentication and authorization units generally designated 303, a pair of redundant display and keyboard servers 204, 205, and a network server display and keyboard 306. Each authentication and authorization unit 303 includes a data processor programmed with a network interface, authentication module, read-only cache of client information, authorization module, read-only cache of file authorization and ownership, and an ethernet interface, similar to the components 103 to 107 and 109 shown in FIG. 9. Each file access and cache unit 302 includes a data processor programmed with an ethernet interface, a file access module, a cache of file access information, a file cache module, and a cache of file data and attributes, similar to the components 108 to 113 shown in FIG. 9.

In contrast to the network file server 20 of FIG. 9, each authentication and authorization unit 303 and each file access and cache unit 302 of the network file server 300 of FIG. 25 is embodied in a respective separate data processor. Consequently, when an authentication and authorization unit 303 has authenticated and authorized a client request, the client request must be routed over the dual redundant ethernet 308 to one of the file access and cache units 302. For access to a read-write file, the authentication and authorization unit 303 must route the client request to the file access and cache unit 302 having exclusive ownership of the file system including the read-write file. For a client request for access to a read-only file, the authentication and authorization unit 303 could route the client request to any one of the file access arid cache units 302. For example, a respective one of the file access and cache units 302 could be assigned to each of the authentication and authorization units 303 for receiving requests for access to read-only files from the authentication and authorization unit. The dual redundant internal Ethernet link 308 functions as a data switch for routing the client requests for file access from the authentication and authorization units 303 to the file access and cache units 302 and returning responses from the file access and cache units to the respective authentication and authorization units 303 for return to the respective clients on the network 307.

The method of the present invention can also be practiced in a network file server having the architecture of FIG. 9 or FIG. 25 but with the cached disk storage system 23 or 301 omitted in each case. Instead of committing write-pending file data, and file attributes, and file access information to the cached disk storage system (e.g., in steps 204 and 205 of FIG. 19 and step 207 of FIG. 20) the write-pending file data, file attributes, and file access information would be committed to disk storage in each of the data movers of FIG. 9 or in each of the file access and cache units 302.

A read-only file systems that would not be very heavily accessed by the network clients could be stored in the disk storage of a particular one of the data movers or file access and cache units, and client requests for access to this read-only file system would be routed (in a similar manner to the routing of client requests for read-write file access) to the data mover or file access and cache unit having the read-only file system in its disk storage and therefore "owning" the read-only file system. A copy of a heavily accessed read-only file system could be stored in disk storage of each of the data movers or file access and cache units so as to avoid any bottleneck to file access.

A network file server not having a cached disk storage subsystem could also employ automatic load balancing. In step 226 of the load balancing module 116 of FIG. 21, the file system x data, attributes, and file access information would also need to be copied from the disk storage of data mover "y" (or file access and cache unit "y") to the disk storage of data mover "z" (or file access and cache unit A network file server riot having a cached disk storage subsystem could use a remote dual copy technique to ensure that a remote copy of data stored on the disk storage of the failed data mover or failed file access and cache unit would be available for recovery purposes. For example, the network file server could employ the remote dual copy method described in Yanai et al. U.S. Pat. No. 5,544,347 issued Aug. 6, 1996 and entitled "Data Storage System Controlled Remote Data Mirroring with Respectively Maintained Data Indices," incorporated herein by reference.

In a system using remote dual copy to provide data availability in the event of a failure in a system without a cached disk storage subsystem, client requests for access to a file would be routed to the data mover or file access and cache unit owning a local copy of the file system including the file to be accessed, and the write-pending data, attributes, and access information of the file would be committed to disk storage in a data mover or file access unit owning a remote copy of the file system, currently with the committing of the write-pending data, attributes, and access information to the disk storage in the data mover or file access and cache unit that is the owner of the local copy of the file system (e.g. in steps 204 and 205 of FIG. 19 and step 207 of FIG. 20).

Figure 26:
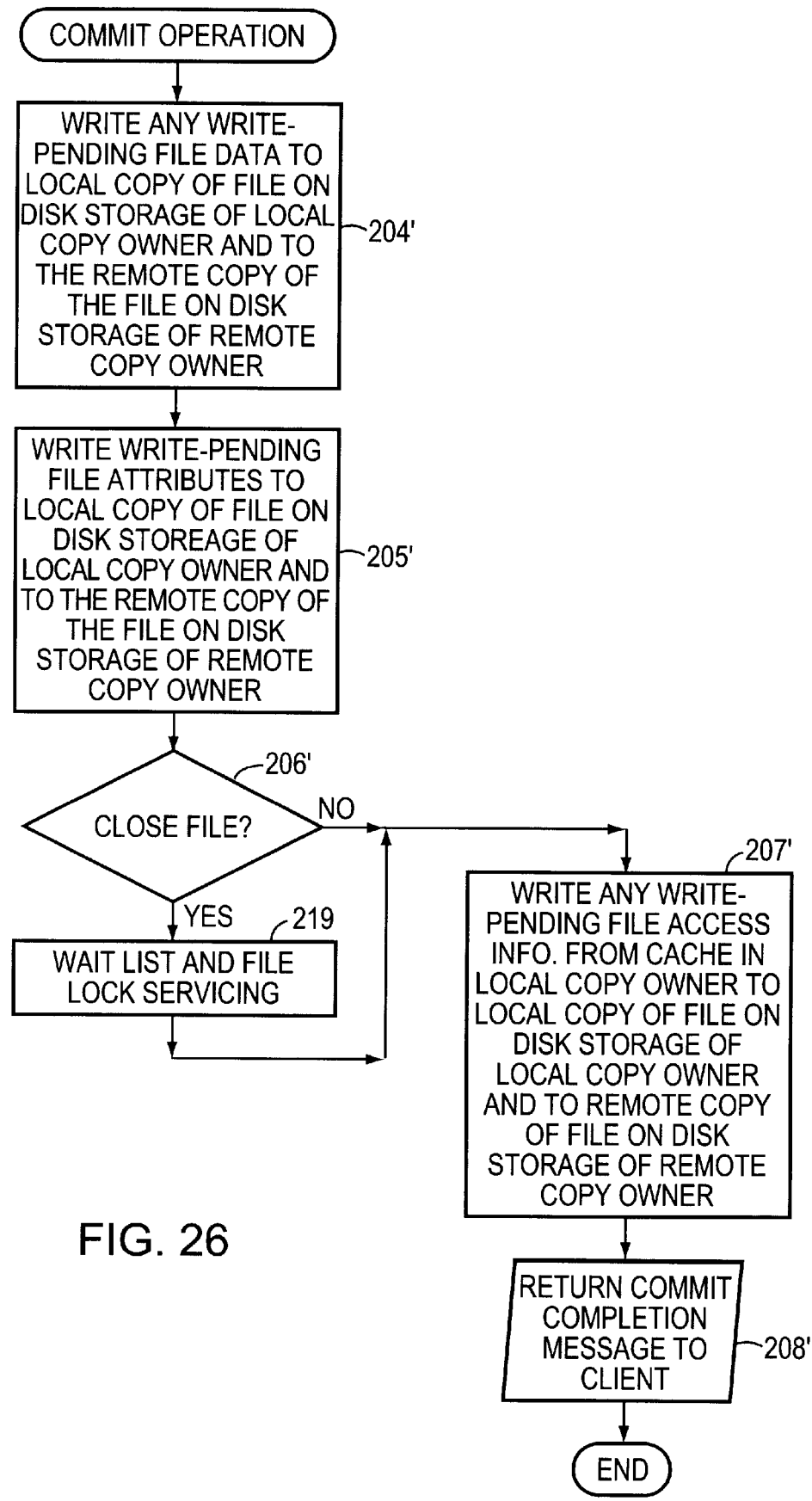
FIG. 26 is a flowchart of a commit operation for a network file server that does not use a cached disk storage subsystem and instead uses a remote dual copy technique to ensure data availability.

Referring to FIG. 26, for example, there is shown a flowchart of the commit operation for a network file system which uses remote dual copy instead of a cached disk storage subsystem. Steps 204', 205', 206', 207' and 208' correspond respectively to steps 204 and 205 of FIG. 19 and steps 206, 207, and 208 of FIG. 20. Step 219 corresponds to steps 210 to 214 in FIG. 20. In step 204' the data processor (i.e., the data mover or file access and cache unit) owning the local copy of the file writes any write-pending file data to the local copy of the file on disk storage of the data processor owning the local copy of the file and to the remote copy of the file on the disk storage of the data processor owning the remote copy of the file. The data processor owning the local copy of the file writes to the remote copy of the file by first checking if ownership of the remote copy is suspend for a pending transfer of remote copy ownership. When the ownership of the remote copy is not suspended, the data processor owning the local copy of the file sends a write command and the write-pending file data to the data processor owning the remote copy of the file. The data processor owning the local copy of the file then waits for an acknowledgement from the data processor owning the remote copy of the file that the data processor owning the remote copy of the file has written the write-pending file data to the remote disk storage or at least to nonvolatile memory of the data processor owning the remote copy of the file.

In step 205' the data processor owning the local copy of the file writes any write-pending file attributes to the local copy of the file on disk storage of the data processor owning the local copy of the file and to the remote copy of the file on the disk storage of the data processor owning the remote copy of the file. The data processor owning the local copy of the file writes to the remote copy of the file by checking whether the ownership of the remote copy is suspended for a transfer of remote copy ownership. When the ownership of the remote copy is not suspended, the data processor owning the local copy of the file sends a write command and the write-pending file attributes to the data processor owning the remote copy of the file. The data processor owning the local copy of the file then waits for an acknowledgement from the data processor owning the remote copy of the file that the data processor owning the remote copy of the file has written the write-pending file attributes to the remote disk storage or at least to nonvolatile memory of the data processor owning the remote copy of the file.

In step 206', execution branches to step 207' if the commit operation is a close file operation. Otherwise, execution continues to step 219 to perform wait list and file lock servicing (as described above with reference to steps 210 to 214 in FIG. 20), and execution continues from step 219 to step 207'.

In step 207', the data processor owning the local copy of the file writes any write-pending file access information to the local copy of the file on disk storage of the data processor owning the local copy of the file and to the remote copy of the file on the disk storage of the data processor owning the remote copy. The data processor owning the local copy of the file writes to the remote copy of the file by checking whether the ownership of the remote copy is suspended for a transfer of remote copy ownership. When the ownership of the remote copy is not suspended, the data processor owning the local copy of the file sends a write command and the write-pending file access information to the data processor owning the remote copy of the file. The data processor owning the local copy of the file then waits for an acknowledgement from the data processor owning the remote copy of the file that the data processor owning the remote copy of the file has written the write-pending file access information to the remote disk storage or at least to nonvolatile memory of the data processor owning the remote copy of the file.

Finally, in step 208', the data processor owning the local copy of the file returns a commit completion message to the client.

In a system that employs remote dual copy instead of a cached disk storage subsystem for ensuring data availability, the load balancing module of FIG. 21 could be used for transferring a read-write file system "x" having a local copy owned by a data processor "y", except that in step 226 of FIG. 21, the local copy of the file system "x" in the disk storage of the data processor "y" would need to be copied to the disk storage of the data mover "z", and in step 227 the data mover "z" would become the new owner of the local copy of the file system "x".

A remote copy of a file system owned by the data processor "y" could also be transferred to another data processor "z" to reduce loading on the data processor "y". In this case, in step 226 of FIG. 21, the remote copy of the file system "x" in the disk storage of the data processor "y" would be copied to the disk storage of the data processor "z", and there would be no need in step 226 to transfer to the data processor "z" any data, attributes, or access information from the caches of the data processor "y" that is write-pending to the file system "x" since the caches of the data processor "y" should have no data, attributes or access information that is write-pending to the file system "x". Moreover, in step 227 the data processor "z" would become the new owner of the remote copy of the file system "x".

In a system that employs remote dual copy instead of a cached disk storage subsystem for ensuring data availability, the failure recovery module of FIG. 22 could be used for recovering from a failed data processor, but the migration subroutines called in steps 235 and 236 would be modified to transfer any remote copies owned by the failed data processor as well as any local copies owned by the failed data processor.

Figure 27:
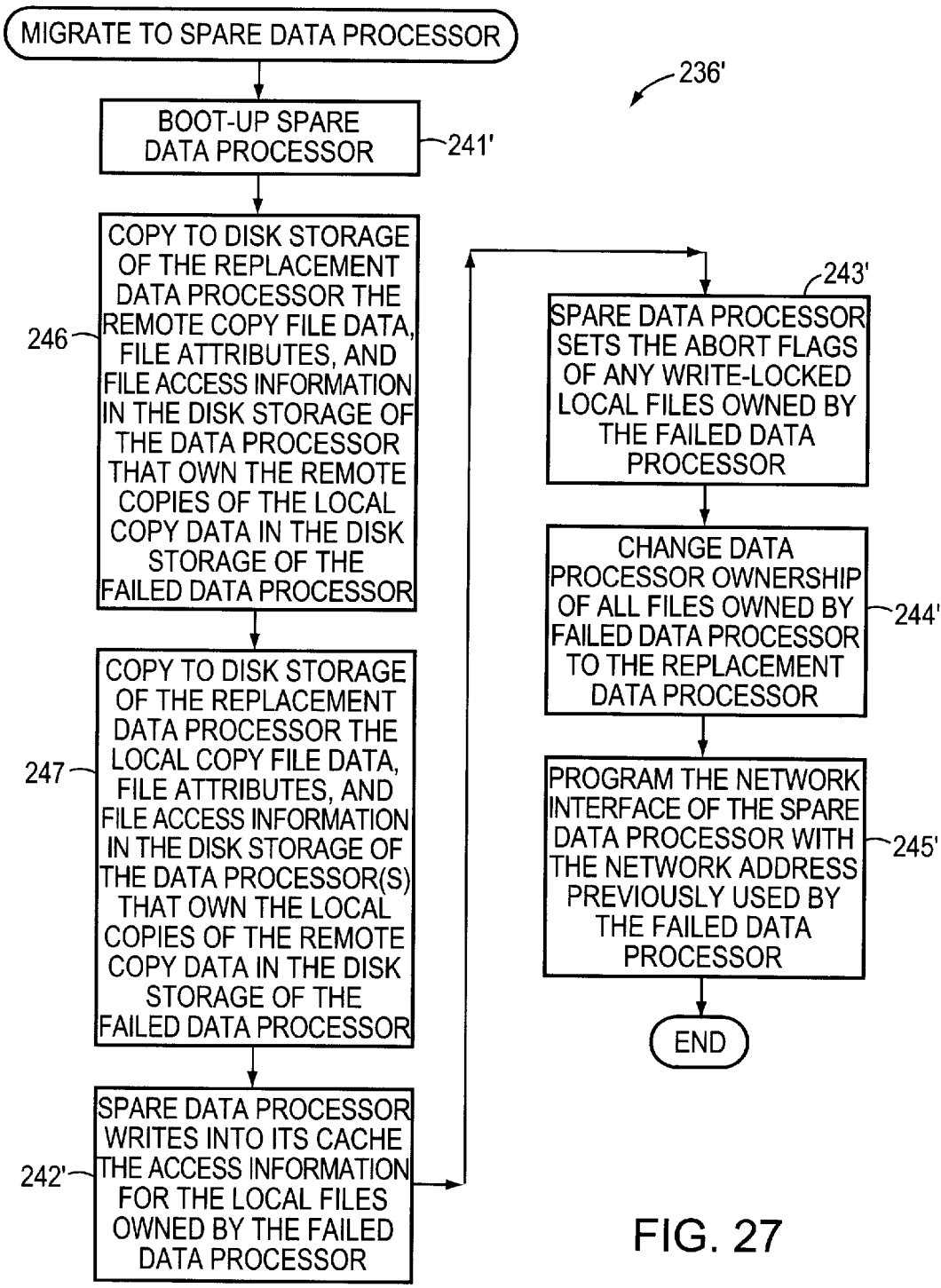
FIG. 27 is a flowchart of a subroutine for migrating file systems owned by a failed data processor to a spare data processor for a network file server that does not use a cached disk storage subsystem and instead uses a remote dual copy technique to ensure data availability.

Referring to FIG. 27, there is shown a flowchart of a subroutine 236' for migrating files owned by a failed data processor to a spare data processor in a system that uses remote dual copy instead of a cached disk storage subsystem for ensuring data availability. Steps 241', 242', 243', 244', and 245' correspond to steps 241, 242, 243, 244, and 245 in FIG. 23. In a first step 241', the active display and keyboard server boots up the spare data processor. Then in step 246 the remote copy file data, file attributes, and file access information in the disk storage of the data processors that own the remote copies of the local copy data in the disk storage of the failed data processor are copied to the disk storage of the replacement data processor. In step 247 the local copy file data, file attributes, and file access information in the disk storage of the data processors that own the local copies of the remote copy data in the disk storage of the failed data processor are copied to the disk storage of the replacement data processor.

In step 242', the spare data processor writes into its cache the access information for the local files owned by the failed data processor. This could be done by fetching the information from the disk storage of the replacement data processor or this could be done in step 246 during the copying of this information to the disk storage of the replacement data processor. In step 243', the spare data processor sets the abort flag of any write-locked local files owned by the failed data processor.

In step 244', the active display and keyboard server changes the data processor ownership of all files owned by the failed data processor to the replacement data processor. Local files owned by the failed data processor become local files owned by the spare data processor, and remote files owned by the failed data processor become remote files owned by the spare data processor. Finally, in step 245', the active display and keyboard server programs the network interface of the spare data processor with the network address previously used by the failed data processor, so that the spare data processor assumes the identity of the failed data processor as seen by network clients.

Figure 28:
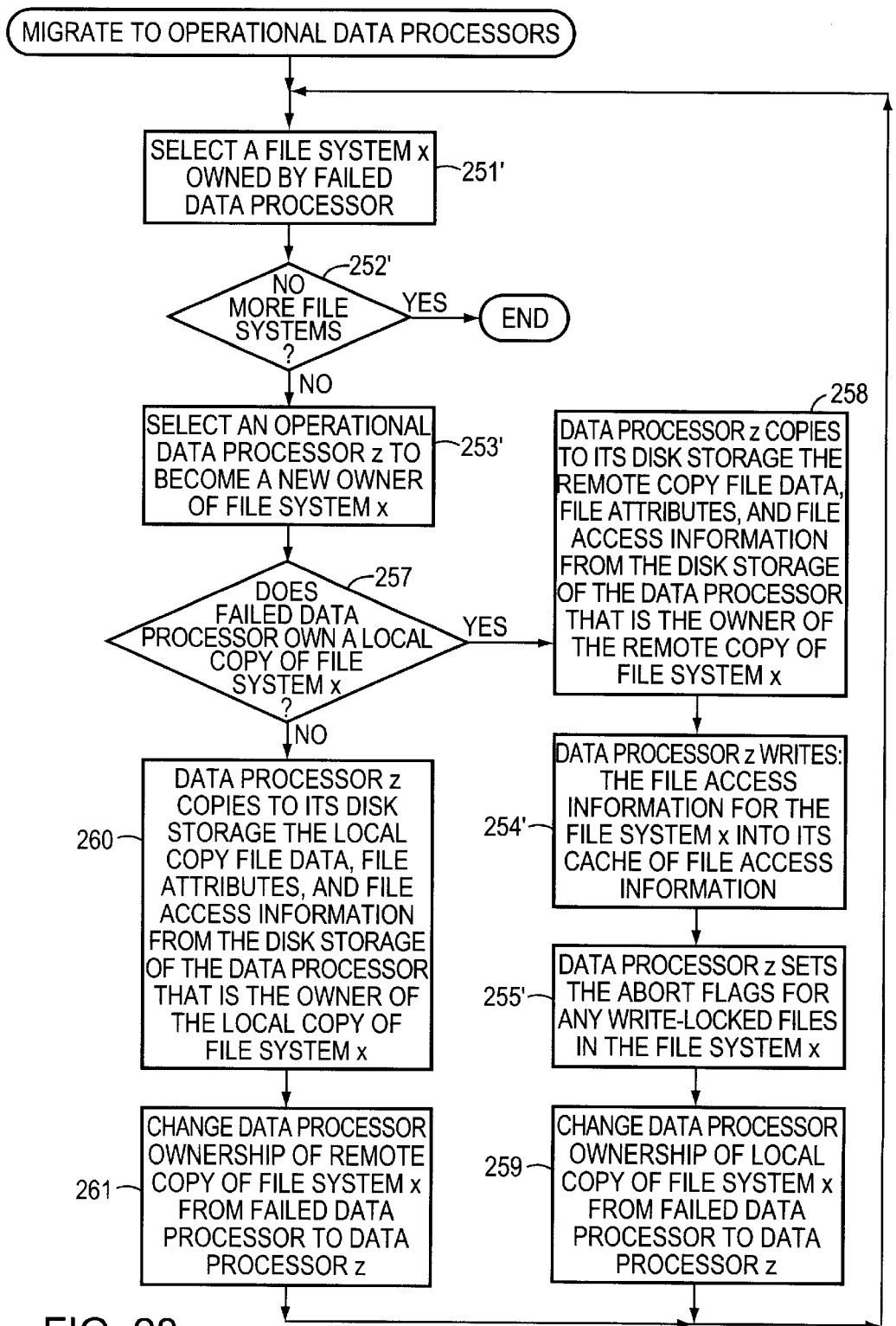
FIG. 28 is a flowchart of a subroutine for migrating file systems owned by a failed data processor to operational data processors for a network file server that does not use a cached disk storage subsystem and instead uses a remote dual copy technique to ensure data availability.

Referring to FIG. 28, there is shown a flowchart of a subroutine for migrating files owned by a failed data processor to operational data processors. Steps 251', 252', 253', 254', and 255' correspond to steps 251, 252, 253, 254, and 256 of FIG. 24. In a first step 251', the active display and keyboard server selects a file system "x" owned by the failed data processor. If there are no more file systems owned by the failed data processor, as tested in step 252', then the migration is finished. Otherwise, execution continues to step 253'. In step 253', the active display and keyboard server selects an operational data processor "z" to become a new owner of the file system "x". Then in step 257, execution branches to step 258 if the failed data processor owns a local copy of the file system "x". In step 258, the data processor "z" copies to its disk storage the remote copy file data, file attributes, and file access information from the disk storage of the data processor that is the owner of the remote copy of the file system "x". Then in step 254' the data processor "z" writes the file access information for the file system "x" into its cache of file access information. This is done so that in the next step 255', the data processor "z" can set the abort flags for any write-locked files in the file system "x". Then in step 259, the active display and keyboard server changes the ownership of the local copy of the file system "x" from the failed data processor to the data processor "z". In this fashion, the data processor "z" becomes the owner of the local copy of the file system "x".

In step 257, execution continues to step 260 if the failed data processor owns a remote copy of the file system "x". In step 260, the data processor "z" copies to its disk storage the local copy file data, file attributes, and file access information from the disk storage of the data processor that is the owner of the local copy of the file system "x". Then in step 261, the active one of the display and keyboard servers changes the data processor ownership of the remote copy of the file system "x" from the failed data processor to the data processor "z". In this fashion, the data processor "z" becomes the owner of the remote copy of the file system "x". Then execution loops back to step 251'.

The method of the present invention could be also used in a distributed network file server using a plurality of conventional data processors linked in a conventional fashion in a local or wide-area data network. Load balancing and failure recover using remote dual copy techniques could be used as just described. The system architecture would be similar to the architecture of FIG. 9 with the cached disk storage system omitted, and also with the dual redundant Ethernet 26 omitted. Instead of passing authenticated and authorized client requests over a local Ethernet from a data mover having received the client request to the data mover owning the local copy of file to be accessed, the authenticated and authorized client requests would be passed over the same data network that includes the clients and is used for transmitting the client requests from the clients to the data processors. An example of such a distributed network file server is shown in FIG. 29.

Figure 29:
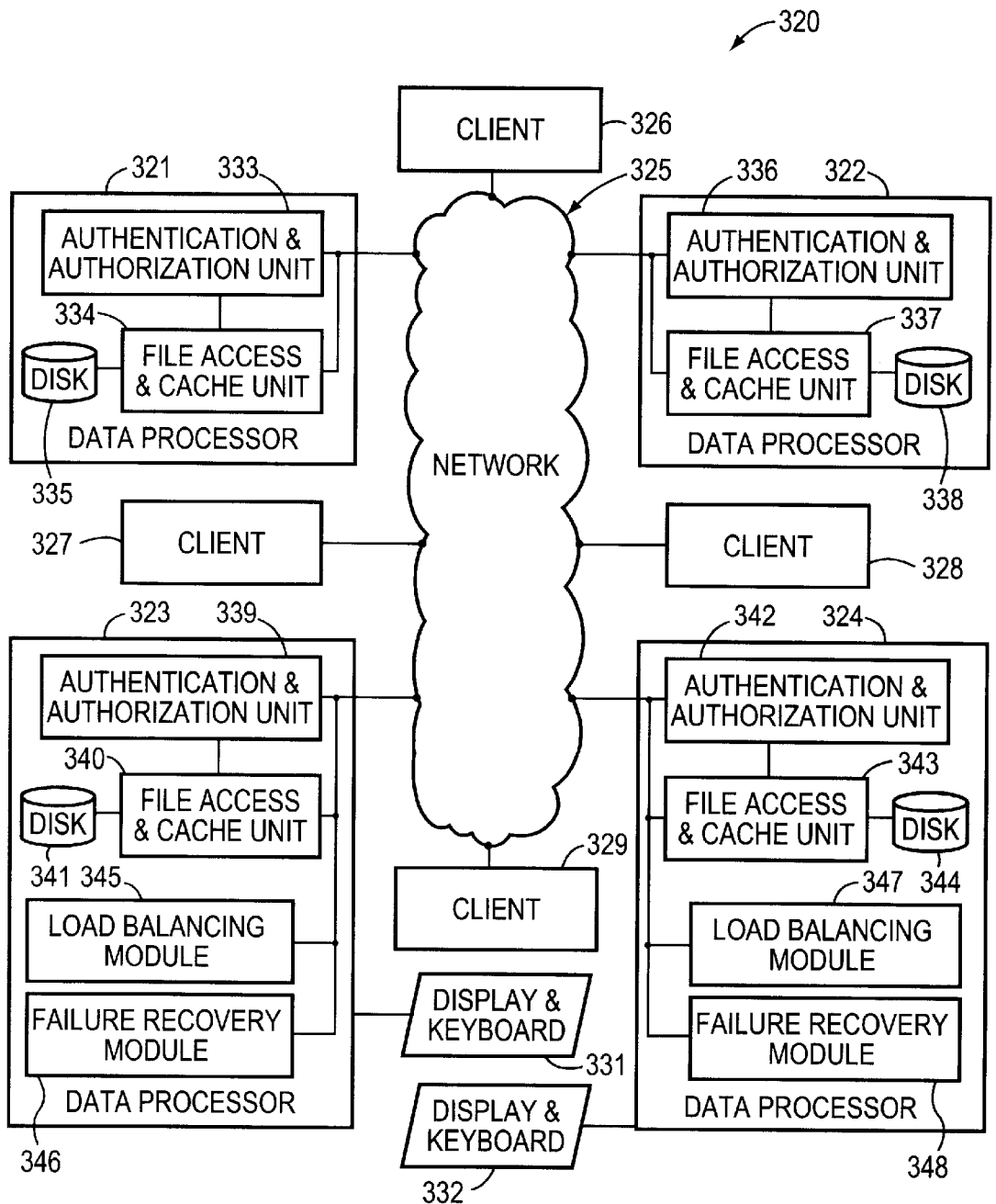
FIG. 29 is a block diagram of a network file server using a plurality of data processors distributed in a data network.

Referring to FIG. 29, the distributed network file server includes a plurality of data processors 321, 322, 323, 324 interconnected in a data network 325. The network 325 links a number of clients 326, 327, 328, 329 for direct access to any one of the data processors 321, 322, 323, 324. Each data processor, for example, is a commodity personal computer having at least one high-capacity disk drive. At least two of the data processors 323 and 324 have a respective display and keyboard and are each programmed (with a respective load balancing module 345, 347 and failure recovery module 346, 348) for functioning as a network server monitoring station.

At any given time, a first one of the two data processors 323, 324 is active for monitoring the file access functions of all of the data processors 321, 322, 323, 324, and the second one of the two data processors 323 and 324 monitors the first one of the two file servers. The second one of the two data processors 323, 324 periodically polls the first one of the two data processors, or periodically receives a status message from the first one of the two data processors, and upon failing to receive a status signal indicating that the first one of the data processors is active in monitoring the other data processors, the second one of the data processors sends a message to the first one of the data processors to deactivate the monitoring function of the first one of the data processors, and then becomes the active data processor for monitoring the data access functions of the data processors.

The data processors 321, 322, 323, 324 could be located at separate geographic locations such as in different buildings. It may be desirable to locate the data processors at separate geographic locations so that a disaster that destroys a local copy of a file system at one geographic location will not destroy a remote copy of the file system at another geographic location. It may also be desirable to locate the data processors at client locations so that data processors could also execute client applications as background tasks. For example, the data processors 323 and 324 could be work stations operated by system administrators having the authority to browse through databases stored on the disk storage of the data processors 321–324 and edit data records in the databases using the respective display and keyboard 321, 322 at each workstation.

Each of the data processors 321, 322, 323, 324 has a respective authentication and authorization unit 333, 336, 339, 342, file access and cache unit 224, 337, 340, 343, and disk storage 335, 338, 342, 344. Each authentication and authorization unit 333, 336, 339, 342 has a network interface, an authentication module, a read-only cache of client information, an authorization module, and a read-only cache of file authorization and ownership information, similar to the network interface 103, authentication module 106, read-only cache of client information 105, authorization module 106, and read-only cache of file authorization and ownership 107 in FIG. 9. Each file access and cache unit 334, 337, 340, and 343 has a network interface, file access module, cache of file access information, file cache module, and a cache of file data and attributes similar to the network interface 103, file access module 108, cache of file access information 111, file cache module 112, and cache of file data and attributes 113 in FIG. 9. Alternatively, the authentication and authorization unit 333, 336, 339, 342 and the file access and cache unit 334, 337, 340, 343 in each of the file servers 321, 322, 323, 324 could share a single network interface in each of the data processors. The load balancing modules 345, 347 and failure recovery modules 346, 348 are similar to the load balancing module 116 and failure recovery module 117 in FIG. 9.

Because the network 325 rather than an internal Ethernet is used for passing authenticated and authorized client requests for file data access between the data processors 321, 322, 323, 324, the distributed file server 320 will have a somewhat different format for passing the authenticated and authorized client requests between the data processors.

Referring to FIG. 30, there is shown a format of a network message for a file access command as transmitted over the network (325 in FIG. 29) from a client to a data processor. The network message has a header including a destination address 401 which is the IP address of the data processor, a source address 402 which is the IP address of the client, and a protocol data unit 403 which includes an NFS command for file access. A message transmitted from a network client to a data mover in the network file server 20 of FIG. 9 has a similar format.

Referring to FIG. 31, there is shown a format of a file access message 410 transmitted over the dual-redundant internal Ethernet 26 in the network file server 20 of FIG. 9 from the authorization module of a secondary data mover having received a client request for file access to the file access module of a primary data mover owning the file system to be accessed. The message 410 has a header including a destination address 411 which is the Ethernet address of the primary data mover, a source address 412 which is the Ethernet address of the secondary data mover, and a protocol data unit including results of authentication and authorization 413, and the NFS command 414 from the client. The results of the authentication and authorization may include any information generated or obtained during the authentication and authorization of the client request that would be useful for file access, such as an internal version of the client ID as used for indexing client information in the data movers if different from the client ID as found in the NFS request, and the priority and any access groups assigned to the client for granting file locks and resolving conflicting lock requests.

Referring to FIG. 32, there is shown a format of a file access message 420 as transmitted in the distributed network file server 320 of FIG. 29 over the network 325 from a secondary data processor having received the client request to a primary data processor owning of the local copy of the file to be accessed. The file access message 420 includes a header having a destination address 421 which is the IP address of the primary data processor, and a source address 422 which is the IP address of the secondary data processor. The message 420 has a protocol data unit including an NFS command 423 and optionally results of authentication and authorization 424. When the results of the authentication and authorization are included in the protocol data unit of the message 420, they could be placed zither before or after the NFS command.

The results of authentication and authorization 424 are optional in the message 420, since it is possible for the primary data processor to again authenticate and authorize the NFS command. This may be desirable for security purposes, or to permit data processor ownership of a file system to be changed when a file access message is being forwarded from one data processor to another since the ownership of the file system to be accessed would be rechecked upon receipt of the message and the message could be redirected to a new owner if the ownership had just changed. It may also be desirable for a data processor in the system of FIG. 29 to process each data access command from each secondary data processor in exactly the same way as each data access command received directly from each network client, since this would simplify programming. In such a case, the secondary data processor "masquerades" as the client from which the message originated. After processing the NFS command 414 in the network message 420 from a secondary data processor, the primary data processor returns a response to the network source address 422, which is the secondary data processor IP address. The secondary data processor then forwards the response to the actual network client, at the client IP address which is the source address 402 in the original message 400 of FIG. 30. If the primary data processor would have received the original message 400 directly from the client, it would have processed the NFS command 403 in the same fashion and would have returned the response to the source address 402 which would have been the client's IP address.

Referring now to FIG. 33, there is shown a table of various file system ownership information used by the data processors 321, 322, 323, 324 in FIG. 29 and stored in each of the data processors. Associated with each file system is a file system identifier, a data processor which owns a local copy of the file system and a flag LSF indicating whether or not ownership of the local copy of the file system is temporarily suspended during a transfer of ownership, and a data processor which owns a remote copy of the file system and a flag RSF indicating whether or not ownership of the remote copy of the file system is temporarily suspended during a transfer of ownership, and any remote file system associated with the file system.

The local copy data processor ownership and any remote file system associated with the file system is analogous to the data mover owner and the remote file system, respectively, in the read-only cache of file authorization and ownership information in FIG. 11 for the network file server 20 of FIG. 9, and would be used by the authentication and authorization units of the data processors in the distributed network file server 320 of FIG. 29 in a similar fashion. The flag LSF would be set in step 224 of FIG. 21 by a load balancing module 245, 347 in FIG. 29 to suspend data mover ownership of the local copy of the file system and would read by a data processor in step 174 in FIG. 16 to determine whether or not there was a transfer of ownership of the local copy of the file system in progress.

The remote copy data processor ownership in FIG. 33 does not correspond to any ownership information for the network file server 20 of FIG. 9, and it is read by the file access and cache units 334, 337, 340, 343 in the data processors of the distributed data processor 320 of FIG. 9 during the commit operation of FIG. 26 to determine the data processor having the disk storage to which write-pending file data, file attributes, and file access information is to be committed. The flag RSF would be set in step 224 of FIG. 21 by a load balancing module 245, 347 in FIG. 29 to suspend data mover ownership of a remote copy of the file system and would read by a data processor during a commit operation in steps 204', 205', and 207' of FIG. 26 to temporarily delay the writing of new remote copy data from the data processor owning the local copy of the file system to the data processor owning the remote copy of file system when a transfer of ownership of the remote copy of the file system is in progress. When the transfer of ownership of the remote copy would be finished, the data processor owning the local copy of the file system would write the new remote copy data to the new owner of the remote copy of the file system.

In view of the above, there has been disclosed a method and apparatus using multiple data processors for permitting a large number of network clients to simultaneously access a large number of files. The multiple data processors can reduce the loading on a cached disk array. Recovery techniques have been provided for recovering from failures of the data processors, so that the multiple data processors can provide a network attachment for the cached disk array without a reduction in the high data availability of the cached disk array. Moreover, if a client request is not acknowledged, the request need not be retransmitted or re-routed to a different network address in order to recover from a data processor failure because a spare data processor can in effect assume the identity of a failed data processor.

There has also been disclosed a similar method of programming an array of commodity digital computers to provide a high-capacity network file server that does not need a cached disk array in order to provide highly reliable data storage. Moreover, the commodity digital computers can be interconnected and distributed in a conventional way in a conventional or existing network.

What is claimed is:

1. A method of operating data processors for servicing clients in a network, each of the data processors having a respective network interface for interfacing to the network, each network interface having a respective network address, and each network interlace being programmable for setting the network address of said each network interface, said method comprising the steps of:

responding to a failure of a failed data processor by setting the network address of the network interface of an operational data processor to the network address of the network interface of the failed data processor; and then said operational data processor servicing client requests received by the network interface of the operational data processor wherein the network interface of the operational data processor is programmed with a physical network address of the network interface of the failed data processor, and the method further includes the operational data processor using a logical network address corresponding to the physical network address of the network interface of the failed data processor for the servicing of the client requests received by the network interface of the operational data processor.

2. The method as claimed in claim 1, wherein the physical address is a machine address code (MAC), and the logical network address is an internet protocol (IP) address used in a network communication protocol for communication over the network between the operational data processor and the clients having originated the client request received by the network interface of the operational data processor.

3. The method as claimed in claim 1, wherein one of the data processors is programmed to monitor status of other data processors, and said one of the data processors responds to a failure of the failed data processor by sending a command to the operational data processor to set the network address of the network interface of the operational data processor to the network address of the network interface of the failed data processor.

4. The method as claimed in claim 3, wherein said one of the data processors periodically polls the other data processors for status, and detects the failure of the failed data processor upon failing to receive a response from the failed data processor.

5. The method as claimed in claim 3, wherein said one of the data processors periodically polls the other data processors for status, and detects the failure of the failed data processor upon receiving from the failed data processor a response indicating the failure of the failed data processor.

6. The method as claimed in claim 1, wherein the operational data processor is substituted in the network for the failed data processor in a fashion that is transparent to a client originally in communication with the failed data processor except for a period of time when there appears to be a data link failure.

7. The method as claimed in claim 1, wherein the failed data processor had received an uncommitted result for a transaction from a client, and the operational data processor aborts the transaction in response to the failure of the failed processor.

8. The method as claimed in claim 1, wherein the failed data processor had received a request for an asynchronous write to a file from a client, and the operational data processor responds to a first request received by the operational data processor from the client for committing a result of the asynchronous writes to the file by sending to the client a reply indicating a failure to commit.

9. The method as claimed in claim 1, wherein the failed data processor had been assigned a set of files for which the failed data processor had exclusive responsibility for management of locks on the set of files, and in response to the failure of the failed data processor, the operational data processor is assigned exclusive responsibility for management of the locks on the set of files.

10. The method as claimed in claim 9, wherein, in response to the failure of the failed data processor, the operational data processor fetches locking information for the set of files to which the operational data processor is assigned.

11. The file server as claimed in claim 10, wherein the data processors receive asynchronous write requests from the clients, and the locking information for the set of files to which the operational data processor is assigned includes indications of write locks on files in the set of files, and the operational data processor signals to clients having write locks on the files in the set of files that any asynchronous write to a write-locked file in the set of files may have failed.

12. The file server as claimed in claim 11, wherein the operational data processor signals to clients having write locks on the files in the set of files that any asynchronous write to a write-locked file in the set of files may have failed by responding to a first request received by the operational data processor from a client for committing results to a write-locked file in the set of files by sending to the client a reply indicating a failure to commit.

13. The file server as claimed in claim 11, wherein the failed data processor and the operational data processor each have respective disk storage, each file in the set of files was stored in the disk storage of the failed data processor, and in response to the failure of the failed data processor, each file in the set of files is written to the disk storage of the operational data processor.

14. The file server as claimed in claim 13, wherein the failed data processor had responsibility for maintaining local copies of files in the set of files in the disk storage of the failed data processor and sending remote copy data to another data processor which maintained in disk storage of said another data processor remote copies corresponding to the local copies of the files in the set of files, and in response to the failure of the failed data processor, the remote copies are read from the disk storage of said another data processor and written to the disk storage of the operational data processor.

* * * * *